US009783452B2

(12) United States Patent
Pesansky et al.

(10) Patent No.: US 9,783,452 B2
(45) Date of Patent: *Oct. 10, 2017

(54) ION-EXCHANGED GLASS OF HIGH SURFACE COMPRESSION AND SHALLOW DEPTH OF LAYER WITH HIGH RESISTANCE TO RADIAL CRACK FORMATION FROM VICKERS INDENTATION

(71) Applicant: Corning Incorporated, Corning, NY (US)

(72) Inventors: Jonathan David Pesansky, Corning, NY (US); Chandan Kumar Saha, Franklin, MI (US); Trevor E Wilantewicz, Elmira, NY (US)

(73) Assignee: Corning Incorporated, Corning, NY (US)

( * ) Notice: Subject to any disclaimer, the term of this patent is extended or adjusted under 35 U.S.C. 154(b) by 240 days.

This patent is subject to a terminal disclaimer.

(21) Appl. No.: 14/547,456

(22) Filed: Nov. 19, 2014

(65) Prior Publication Data

US 2015/0074974 A1    Mar. 19, 2015

Related U.S. Application Data

(63) Continuation-in-part of application No. 13/533,298, filed on Jun. 26, 2012, now Pat. No. 9,290,413, and a continuation-in-part of application No. 13/678,013, filed on Nov. 15, 2012, now Pat. No. 9,156,724, application No. 14/547,456, which is a continuation-in-part of application No. 14/456,354, filed on Aug. 11, 2014.

(60) Provisional application No. 61/503,734, filed on Jul. 1, 2011, provisional application No. 61/560,434, filed on Nov. 16, 2011, provisional application No. 61/907,121, filed on Nov. 21, 2013.

(51) Int. Cl.
*C03C 3/097* (2006.01)
*C03C 21/00* (2006.01)
*C03C 3/091* (2006.01)
*C03C 3/083* (2006.01)
*C03C 3/085* (2006.01)
*C03C 3/087* (2006.01)
*C03C 3/093* (2006.01)

(52) U.S. Cl.
CPC .............. *C03C 3/097* (2013.01); *C03C 3/083* (2013.01); *C03C 3/085* (2013.01); *C03C 3/087* (2013.01); *C03C 3/091* (2013.01); *C03C 3/093* (2013.01); *C03C 21/002* (2013.01); *Y10T 29/49863* (2015.01); *Y10T 428/315* (2015.01)

(58) Field of Classification Search
CPC ......... C03C 3/083; C03C 3/085; C03C 3/087; C03C 3/097; C03C 21/002
See application file for complete search history.

(56) References Cited

U.S. PATENT DOCUMENTS

| 3,357,876 | A * | 12/1967 | Rinehart | C03C 3/097 252/193 |
| 6,818,576 | B2 * | 11/2004 | Ikenishi | B24B 37/042 428/846.9 |
| 8,158,543 | B2 * | 4/2012 | Dejneka | C03C 1/004 428/410 |
| 8,187,987 | B2 | 5/2012 | Amin et al. | 501/69 |
| 8,232,218 | B2 * | 7/2012 | Dejneka | C03B 17/067 428/410 |
| 8,327,666 | B2 | 12/2012 | Harvey et al. | 65/112 |
| 8,341,976 | B2 | 1/2013 | Dejneka et al. | 65/112 |
| 8,367,208 | B2 | 2/2013 | Glaesemann et al. | 428/410 |
| 8,586,492 | B2 | 11/2013 | Barefoot et al. | 501/66 |
| 8,759,238 | B2 * | 6/2014 | Chapman | C03C 3/097 428/410 |
| 8,765,262 | B2 | 7/2014 | Gross | |
| 8,796,165 | B2 | 8/2014 | Ellison et al. | 501/66 |
| 8,802,581 | B2 * | 8/2014 | Dejneka | C03B 17/064 428/410 |
| 9,156,724 | B2 * | 10/2015 | Gross | C03C 3/091 |
| 9,290,413 | B2 * | 3/2016 | Dejneka | C03C 3/087 |
| 9,556,058 | B2 | 1/2017 | Dejneka et al. | |
| 2008/0286548 | A1 * | 11/2008 | Ellison | C03B 17/06 428/220 |
| 2009/0197088 | A1 * | 8/2009 | Murata | C03C 3/083 428/410 |
| 2010/0047521 | A1 | 2/2010 | Amin et al. | 428/141 |
| 2011/0045961 | A1 * | 2/2011 | Dejneka | C03B 17/064 501/66 |
| 2011/0294648 | A1 * | 12/2011 | Chapman | C03C 3/097 501/63 |

(Continued)

FOREIGN PATENT DOCUMENTS

WO    2013073685    5/2013

OTHER PUBLICATIONS

Morris et al.; "Indentation crack initiation in ion-exchanged aluminosilicate glass"; Materials Science 39 (2004); pp. 2399-2410.
Arora, D.B. Marshall, and B.R. Lawn, "Indentation deformation/fracture of normal and anomalous glasses," Journal of Non-Crystalline Solids, 31 415-428 (1979).
Hagan and M.V. Swain, "The origin of median and lateral cracks around plastic indents in brittle materials," J. Phys. D: Appl. Phys., 11 2091-2102 (1978).
Hagan and S. Van Der Zwaag, "Plastic processes in a range of soda-lime-silica glasses," Journal of Non-Crystalline Solids, 64 249-268 (1984).
Hagan, "Shear deformation under pyramidal indentations in soda-lime glass," Journal of Materials Science, 15 1417-1424 (1980).

(Continued)

Primary Examiner — Elizabeth A Bolden

(57) ABSTRACT

Disclosed are alkali aluminosilicate glasses having unexpected resistance to indentation cracking. The glasses obtain this high resistance as a result of a high level of surface compression accompanied by a shallow depth of layer. The advantaged glasses show greater resistance to radial crack formation from Vickers indentation than glasses with the same compressive stress, but higher depths of layer.

10 Claims, 9 Drawing Sheets

(56) References Cited

U.S. PATENT DOCUMENTS

| | | | |
|---|---|---|---|
| 2012/0135226 A1* | 5/2012 | Bookbinder | C03C 3/062 428/335 |
| 2012/0196110 A1* | 8/2012 | Murata | C03B 25/08 428/220 |
| 2014/0226090 A1* | 8/2014 | Akiba | C03C 3/085 349/12 |
| 2015/0024210 A1* | 1/2015 | Dejneka | C03B 17/064 428/410 |
| 2015/0368150 A1* | 12/2015 | Gross | C03C 3/097 501/63 |

OTHER PUBLICATIONS

Kato et al. "Effect of densification on crack initiation under Vickers indentation test," 356 J. Non-Crystalline Solids 1768-1773 (2010).
Kato et al., "Load dependence of densification in glass during Vickers indentation test," 119 J. Ceram. Soc. Japan 110-115 (2011).
Peter, "Densification and flow phenomena of glass in indentation experiments," Journal of Non-Crystalline Solids, 5 103-115 (1970).
Rene Gy, "Ion-exchange for glass strengthening," Materials science & Engineering B 149 159-165 (2008).

* cited by examiner

ION-EXCHANGED GLASS OF HIGH SURFACE COMPRESSION AND SHALLOW DEPTH OF LAYER WITH HIGH RESISTANCE TO RADIAL CRACK FORMATION FROM VICKERS INDENTATION

This application is a continuation-in-part of U.S. application Ser. No. 13/533,298, filed on Jun. 26, 2012, which claims the benefit of priority of U.S. Provisional Application Ser. No. 61/503,734, filed on Jul. 1, 2011; a continuation in part of U.S. application Ser. No. 13/678,013, filed on Nov. 15, 2012, which claims the benefit of priority of U.S. Provisional Application Ser. No. 61/560,434, filed on Nov. 16, 2011; and a continuation-in-part of U.S. application Ser. No. 14/456,354, filed on Aug. 11, 2014; and claims the benefit of priority under 35 U.S.C. §119 of U.S. Provisional Application Ser. No. 61/907,121, filed on Nov. 21, 2013, the content of all is relied upon and all applications are incorporated herein by reference in their entireties.

FIELD

The disclosure relates to damage resistant glasses and more particularly, to damage resistant glasses that have optionally been strengthened by ion exchange. In some cases, the disclosure relates to damage resistant ion exchanged glasses having high surface compression while also having shallow depths of layer while still retaining a resistance to radial crack formation.

BACKGROUND

It is generally the case that ion-exchanged glass has higher resistance to radial crack formation from Vickers indentation when compared to non-strengthened glass of the same composition. The stress profile, in particular the magnitude of the compressive stress (the value of compressive stress at the surface, and is regarded as the maximum value, hereinafter "compressive stress" or "CS") on the surface of the glass, plays a key role in this area. It is also traditionally been assumed that higher compressive stresses, and deeper depths of compression, will lead to enhanced performance. Equally important in controlling this behavior is the glass composition and structure/molar volume, both of which relate to the residual stresses and flaw population created by the indentation. While it is generally true that higher depth of layer ("DOL")—the maximum depth of the compressive stress layer below the surface—results in enhanced performance especially with regard to retained strength, the current disclosure provides the unexpectedly unique result that for certain compositions and compressive stress levels, shallower DOLs bring the distinct and desirable attribute of higher resistance to indentation fracture.

SUMMARY

Disclosed are glasses for making a strengthened glass articles having a high indentation fracture threshold ("IFT") at low DOLs and high CS. A first aspect comprises a glass for making a strengthened glass article, where the glass comprises an ion-exchangeable, boron-free, alkali aluminosilicate glass composition that is capable of achieving a compressive stress from about 600 to about 1200 MPa at a depth of layer from about 10 to about 40 μm and an indentation fracture threshold from about 10 to about 50 kg. In some cases, the compressive stress is from about 600 to about 1000 MPa, the depth of layer is from about 15 to about 30 μm, and the indentation fracture threshold is from about 12 to about 45 kg. In other cases, the compressive stress is from about 700 to about 1000 MPa, the depth of layer is from about 15 to about 25 μm, and the indentation fracture threshold is from about 14 to about 40 kg.

In some embodiments of the aspects herein, the glass composition comprises composition (1-1):

$$61 \text{ mol }\% \leq SiO_2 \leq 75 \text{ mol }\%;$$

$$7 \text{ mol }\% \leq Al_2O_3 \leq 15 \text{ mol }\%;$$

$$0 \text{ mol }\% \leq B_2O_3 \leq 1 \text{ mol }\%;$$

$$9 \text{ mol }\% \leq Na_2O \leq 21 \text{ mol }\%;$$

$$0 \text{ mol }\% \leq K_2O \leq 4 \text{ mol }\%;$$

$$0 \text{ mol }\% \leq MgO \leq 7 \text{ mol }\%; \text{ and}$$

$$0 \text{ mol }\% \leq CaO \leq 3 \text{ mol }\%. \quad (1\text{-}1)$$

In some circumstances, the glass composition comprising composition (1-1), may further satisfy one or more of equations:

$$47 \text{ mol }\% \geq B_2O_3 + Na_2O + K_2O + MgO + CaO \geq 18 \text{ mol }\%; \text{ or}$$

$$30 \text{ mol }\% \geq B_2O_3 + Na_2O + K_2O - Al_2O_3 \geq 0.$$

Alternatively, the glass composition may comprise composition (2-1):

$$\text{about } 50 \text{ mol }\% \text{ to about } 75 \text{ mol }\% \text{ SiO}_2;$$

$$\text{about } 7 \text{ mol }\% \text{ to about } 26 \text{ mol }\% \text{ Al}_2\text{O}_3;$$

$$0 \text{ mol }\% \text{ to about } 1 \text{ mol }\% \text{ B}_2\text{O}_3;$$

$$\text{about } 11 \text{ mol }\% \text{ to about } 25 \text{ mol }\% \text{ Na}_2\text{O};$$

$$0 \text{ mol }\% \text{ to about } 2.5 \text{ mol }\% \text{ K}_2\text{O};$$

$$0 \text{ mol }\% \text{ to about } 8.5 \text{ mol }\% \text{ MgO}; \text{ and}$$

$$0 \text{ mol }\% \text{ to about } 1.5 \text{ mol }\% \text{ CaO}. \quad (2\text{-}1)$$

Compositions comprising (2-1) may further satisfy one or more of equations:

$$-340 + 27.1.Al_2O_3 - 28.7.B_2O_3 + 15.6.Na_2O - 61.4.K_2O + 8.1.(MgO+ZnO) \geq 0 \text{ mol }\%;$$

$$Na_2O + Al_2O_3 + MgO + ZnO > 25 \text{ mol }\%;$$

$$SiO_2 + Al_2O_3 + B_2O_3 + Na_2O + K_2O + MgO + ZnO \geq 95 \text{ mol }\%;$$

$$Na_2O + K_2O - Al_2O_3 - MgO - ZnO \approx 0; \text{ or}$$

$$-5 \text{ mol }\% \leq Na_2O + K_2O - Al_2O_3 - MgO - ZnO \leq 4 \text{ mol }\%.$$

Another embodiment comprises a glass composition (3-1) comprising at least about 4 mol % $P_2O_5$ and less than about 1 mol % $B_2O_3$, and wherein:

$$0.6 < [M_2O_3(\text{mol }\%)/R_xO(\text{mol }\%)] < 1.4; \text{ or} \qquad \text{i.}$$

$$1.3 < [(P_2O_5 + R_2O)/M_2O_3] \leq 2.3; \qquad \text{ii. (3-1)}$$

where $M_2O_3 = Al_2O_3 + B_2O_3$, $R_xO$ is the sum of monovalent and divalent cation oxides present in the glass composition, and $R_2O$ is the sum of monovalent cation oxides present in the glass composition. The glass composition may further comprise:

about 40 mol % to about 70 mol % $SiO_2$;

about 11 mol % to about 25 mol % $Al_2O_3$;

about 4 mol % to about 15 mol % $P_2O_5$;

0 mol % to less than about 1 mol % $B_2O_3$; and about 13 mol % to about 25 mol % $Na_2O$. (3-2)

or, alternatively, may comprise:

about 50 mol % to about 65 mol % $SiO_2$;

about 14 mol % to about 20 mol % $Al_2O_3$;

0 mol % to less than about 1 mol % $B_2O_3$;

about 4 mol % to about 10 mol % $P_2O_5$; and about 14 mol % to about 20 mol % $Na_2O$. (3-3)

The glass compositions of (3-1), (3-2), and (3-3) may optionally satisfy one or more of the equations:

$0.6 < [M_2O_3(\text{mol }\%)/R_xO(\text{mol }\%)] < 1.4$;

$0.6 < [M_2O_3(\text{mol }\%)/R_xO(\text{mol }\%)] < 1$;

$1.3 < [(P_2O_5+R_2O)/M_2O_3] \leq 2.3$; and $1.5 < [(P_2O_5+R_2O)/M_2O_3] \leq 2.0$. (3-3)

Additionally, The glass compositions of (3-1), (3-2), and (3-3) may optionally comprise less than 1 mol % $K_2O$ or the monovalent and divalent cation oxides are selected from the group consisting of $Li_2O$, $Na_2O$, $K_2O$, $Rb_2O$, $Cs_2O$, $MgO$, $CaO$, $SrO$, $BaO$, and $ZnO$.

A second aspect comprises a glass article comprising any of the embodied glasses described herein.

A third aspect comprises a method of ion exchanging a glass composition having a layer under compressive stress, the layer extending from a surface of the glass article to a depth of layer, comprising providing any of the glass articles described herein and ion exchanging the glass article in a bath at a temperature of up to about 410° C. for from about 15 minutes to about 24 hours to form the layer, wherein the compressive stress of the layer is from about 600 MPa to about 1200 MPa and the depth of layer is from about 10 μm to about 40 μm. In some embodiments, the compressive stress is from about 600 to about 1000 MPa, the depth of layer is from about 15 to about 30 μm, and the indentation fracture threshold is from about 12 to about 45 kg. In some embodiments, the compressive stress is from about 700 to about 1000 MPa, the depth of layer is from about 15 to about 25 μm, and the indentation fracture threshold is from about 14 to about 40 kg.

A fourth aspect comprises a method of making a device comprising a glass article having a layer under compressive stress, the layer extending from a surface of the glass article to a depth of layer, comprising providing a glass article as described herein and ion exchanging the glass article in a bath at a temperature of up to about 410° C. for from about 15 minutes to about 24 hours to form the layer, wherein the compressive stress of the layer is from about 600 MPa to about 1200 MPa and the depth of layer is from about 10 μm to about 40 μm and the glass article is incorporated into a device. In some embodiments, the compressive stress is from about 700 to about 1000 MPa, the depth of layer is from about 15 to about 25 μm, and the indentation fracture threshold is from about 14 to about 40 kg.

These and other aspects, advantages, and salient features will become apparent from the following detailed description, the accompanying drawings, and the appended claims.

DETAILED DESCRIPTION

Figure 1:
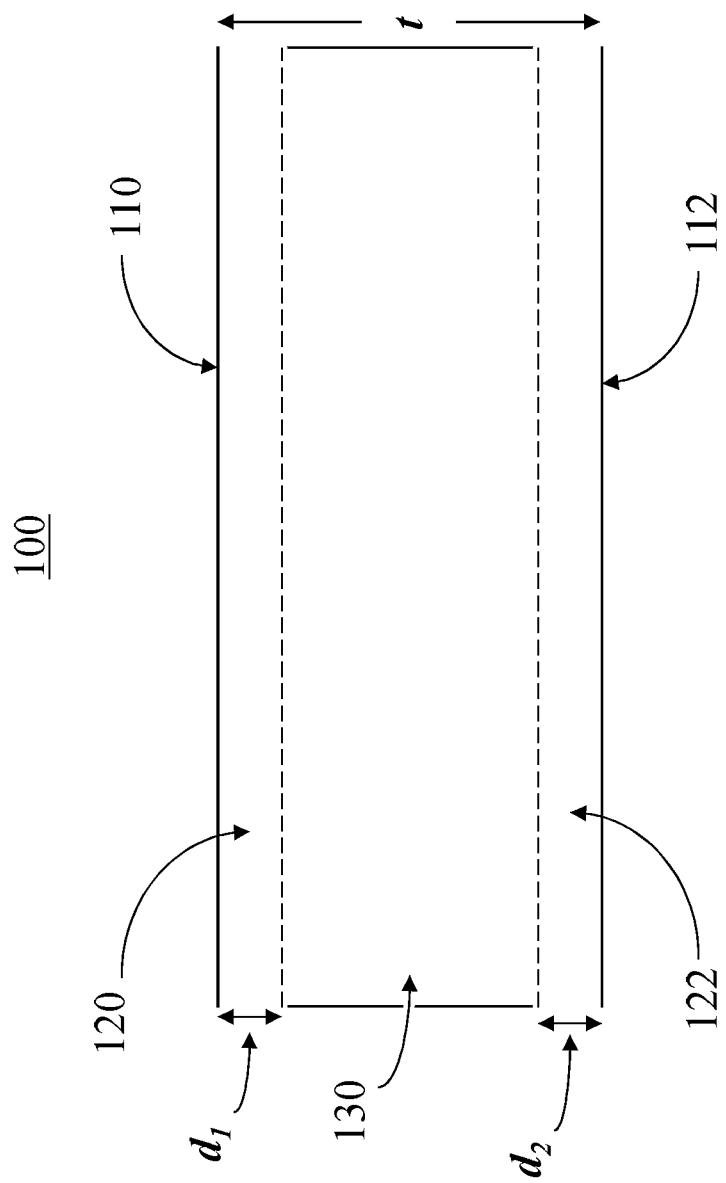
FIG. 1 is a schematic cross-sectional view of a glass sheet strengthened by ion exchange.

Disclosed herein are alkali aluminosilicate glasses having unexpected resistance to indentation cracking (which we will call indentation fracture threshold (IFT) from here onward). The glasses obtain this high IFT, at least in part, as a result of a high level of surface compression accompanied by a shallow depth of layer. The advantage of a high CS and shallow DOL is that it leads to greater resistance to radial crack formation from Vickers indentation than the same CS with a higher DOL. This is beneficial when high resistance to the initiation of radial cracking is the primary objective, such as in the case of an electronic device, where the resistance of the cover glass to indentation cracking would help prevent crack propagation and thus, increase the likelihood that a user could continue to use the device even after the screen has been subjected to substantial impact damage.

Further, disclosed are materials, compounds, compositions, and components that can be used for, can be used in conjunction with, can be used in preparation for, or are embodiments of the disclosed method and compositions. These and other materials are disclosed herein, and it is understood that when combinations, subsets, interactions, groups, etc. of these materials are disclosed that while specific reference of each various individual and collective combinations and permutation of these compounds may not be explicitly disclosed, each is specifically contemplated and described herein.

Thus, if a class of substituents A, B, and C are disclosed as well as a class of substituents D, E, and F, and an example of a combination embodiment, A-D is disclosed, then each is individually and collectively contemplated. Thus, in this example, each of the combinations A-E, A-F, B-D, B-E, B-F, C-D, C-E, and C-F are specifically contemplated and should be considered disclosed from disclosure of A, B, and/or C; D, E, and/or F; and the example combination A-D. Likewise, any subset or combination of these is also specifically contemplated and disclosed. Thus, for example, the sub-group of A-E, B-F, and C-E are specifically contemplated and should be considered disclosed from disclosure of A, B, and/or C; D, E, and/or F; and the example combination A-D. This concept applies to all aspects of this disclosure including, but not limited to any components of the compositions and steps in methods of making and using the disclosed compositions. Thus, if there are a variety of additional steps that can be performed it is understood that each of these additional steps can be performed with any specific embodiment or combination of embodiments of the disclosed methods, and that each such combination is specifically contemplated and should be considered disclosed.

In addition, whenever a group is described as comprising at least one of a group of elements and combinations thereof, it is understood that the group may comprise, consist essentially of, or consist of any number of those elements recited, either individually or in combination with each other. Similarly, whenever a group is described as consisting of at least one of a group of elements or combinations thereof, it is understood that the group may consist of any number of those elements recited, either individually or in combination with each other.

Moreover, where a range of numerical values is recited herein, comprising upper and lower values, unless otherwise stated in specific circumstances, the range is intended to include the endpoints thereof, and all integers and fractions within the range. It is not intended that the scope of the disclosure be limited to the specific values recited when defining a range. Further, when an amount, concentration, or other value or parameter is given as a range, one or more preferred ranges or a list of upper preferable values and lower preferable values, this is to be understood as specifically disclosing all ranges formed from any pair of any upper range limit or preferred value and any lower range limit or preferred value, regardless of whether such pairs are separately disclosed. Finally, when the term "about" is used in describing a value or an end-point of a range, the disclosure should be understood to include the specific value or end-point referred to.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. In general, an amount, size, formulation, parameter or other quantity or characteristic is "about" or "approximate" whether or not expressly stated to be such.

The term "or", as used herein, is inclusive; more specifically, the phrase "A or B" means "A, B, or both A and B". Exclusive "or" is designated herein by terms such as "either A or B" and "one of A or B", for example.

The indefinite articles "a" and "an" are employed to describe elements and components of embodiments. The use of these articles means that one or at least one of these elements or components is present. Although these articles are conventionally employed to signify that the modified noun is a singular noun, as used herein the articles "a" and "an" also include the plural, unless otherwise stated in specific instances. Similarly, the definite article "the", as used herein, also signifies that the modified noun may be singular or plural, again unless otherwise stated in specific instances.

For the purposes of describing the embodiments, it is noted that reference herein to a variable being a "function" of a parameter or another variable is not intended to denote that the variable is exclusively a function of the listed parameter or variable. Rather, reference herein to a variable that is a "function" of a listed parameter is intended to be open ended such that the variable may be a function of a single parameter or a plurality of parameters. It is also understood that, unless otherwise specified, terms such as "top," "bottom," "outward," "inward," and the like are words of convenience and are not to be construed as limiting terms.

It is noted that terms like "preferably," "commonly," and "typically," when utilized herein, are not utilized to limit the scope or to imply that certain features are critical, essential, or even important to the structure or function of the embodiments described. Rather, these terms are merely intended to identify particular aspects of an embodiment or to emphasize alternative or additional features that may or may not be utilized in a particular embodiment.

For the purposes of describing and defining embodiments it is noted that the terms "substantially" and "approximately" are utilized herein to represent the inherent degree of uncertainty that may be attributed to any quantitative comparison, value, measurement, or other representation. The terms "substantially" and "approximately" are also utilized herein to represent the degree by which a quantitative representation may vary from a stated reference without resulting in a change in the basic function of the subject matter at issue.

It is noted that one or more of the claims may utilize the term "wherein" as a transitional phrase. For the purposes of defining embodiments, it is noted that this term is introduced in the claims as an open-ended transitional phrase that is used to introduce a recitation of a series of characteristics of the structure and should be interpreted in like manner as the more commonly used open-ended preamble term "comprising."

As a result of the raw materials and/or equipment used to produce the glass composition, certain impurities or components that are not intentionally added, can be present in the final glass composition. Such materials are present in the glass composition in minor amounts and are referred to herein as "tramp materials."

As used herein, a glass composition having 0 wt % or mol % of a compound is defined as meaning that the compound, molecule, or element was not purposefully added to the composition, but the composition may still comprise the compound, typically in tramp or trace amounts. Similarly, "sodium-free," "alkali-free," "potassium-free" or the like are defined to mean that the compound, molecule, or element was not purposefully added to the composition, but the composition may still comprise sodium, alkali, or potassium, but in approximately tramp or trace amounts. Unless otherwise specified, the concentrations of all constituents recited herein are expressed in terms of mole percent (mol %).

Indentation fracture threshold (IFT) is measured by using a Vickers indenter. The Vickers indenter is a square based diamond pyramid having four faces, with the included angle between opposite faces of 136°. The technique (see, e.g., D. J. Morris, S. B. Myers, and R. F. Cook, "Indentation crack initiation in ion-exchanged aluminosilicate glass," 39 J. MAT. SCI. 2399-2410 (2004), herein incorporated by reference in its entirety) involves making multiple indentations with a Vickers indenter at a constant load. IFT measurements described herein are performed by applying and then removing an indentation load to the glass surface at a rate of 0.2 mm/min wherein the indentation load is held for 10 seconds and the maximum load. All indentation measurements are performed at room temperature in 50% relative humidity. The IFT is defined at the indentation load at which 50% of indents at a load exhibit any number of radial/median cracks emanating from the corners of the indent impression. The maximum load is increased until the threshold is met for a given glass composition.

Referring to the drawings in general and to FIG. 1 in particular, it will be understood that the illustrations are for the purpose of describing particular embodiments and are not intended to limit the disclosure or appended claims thereto. The drawings are not necessarily to scale, and certain features and certain views of the drawings may be shown exaggerated in scale or in schematic in the interest of clarity and conciseness.

Glass Compositions

The ion-exchanged glasses disclosed herein have unexpected resistance to IFT at high CS and shallow DOL. Glass compositions which are able to achieve this unique property are generally alkali aluminosilicate glasses, particularly alkali aluminosilicate glasses that do not contain boron. More specifically, the glass compositions embodied herein include those non-boron containing compositions specified in U.S. application Ser. Nos. 12/856,840, 13/533,298, and 13/677,805, all of which are hereby incorporated by reference in their entireties. For example, one embodied glass composition able to achieve high IFT at high CS and shallow DOL comprises $SiO_2$ and $Na_2O$, wherein $SiO_2+B_2O_3 \geq 66$ mol %, and $Na_2O \geq 9$ mol %. The glass, in some embodiments, further comprises at least one of $K_2O$, MgO, and CaO. In a particular embodiment, the glass comprises:

61 mol % $\leq SiO_2 \leq$ 75 mol %;

7 mol % $\leq Al_2O_3 \leq$ 15 mol %;

0 mol % $\leq B_2O_3 \leq$ 1 mol %;

9 mol % $\leq Na_2O \leq$ 21 mol %;

0 mol % $\leq K_2O \leq$ 4 mol %;

0 mol % $\leq MgO \leq$ 7 mol %; and 0 mol % $\leq CaO \leq$ 3 mol %.

Embodiments may further meet the criteria that:

47 mol % $\geq B_2O_3+Na_2O+K_2O+MgO+CaO \geq 18$ mol %; or 30 mol % $\geq B_2O_3+Na_2O+K_2O-Al_2O_3 \geq 0$.

The glass, in some embodiments, may additionally comprise at least one fining agent such as, but not limited to, a halogen or a multivalent fining agent such as $As_2O_3$, $Sb_2O_3$, $SnO_2$, or $Fe_2O_3$. In a particular embodiment, the total concentration of $As_2O_3$ and $Sb_2O_3$, if either or both are present, is less than 500 ppm by weight.

Alternatively, other embodied glass compositions that are able to achieve resistance to IFT at high CS and shallow DOL include compositions comprising at least about 50 mol % $SiO_2$ and at least about 11 mol % $Na_2O$. In some embodiments, the glass article comprises:

about 50 mol % to about 75 mol % $SiO_2$;

about 7 mol % to about 26 mol % $Al_2O_3$;

about 0 mol % $B_2O_3$;

about 11 mol % to about 25 mol % $Na_2O$;

0 mol % to about 2.5 mol % $K_2O$;

0 mol % to about 8.5 mol % MgO; and 0 mol % to about 1.5 mol % CaO.

Embodiments may further meet the criteria that:

$-340+27.1.Al_2O_3-28.7.B_2O_3+15.6.Na_2O-61.4.K_2O+8.1.(MgO+ZnO) \geq 0$ mol %;

$Na_2O+Al_2O_3+MgO+ZnO>25$ mol %; or $SiO_2+Al_2O_3+B_2O_3+Na_2O+K_2O+MgO+ZnO \geq 95$ mol %.

In some embodiments, the aluminosilicate glass article described herein comprises $SiO_2$, $Na_2O$, $Al_2O_3$, and at least one of $K_2O$, MgO and ZnO, and wherein $Na_2O+Al_2O_3+MgO+ZnO>25$ mol %. Additionally, in some embodiments, be desirable that most of the alkali metal oxides in the glass articles described herein can be accounted for as charge-balancing cations for aluminum, magnesium and zinc; i.e., $Na_2O+K_2O-Al_2O_3-MgO-ZnO \approx 0$.

In the same way that the relative proportions of Na, K, Al, Mg, and Zn oxides may be varied to achieve various ion exchange effects, $B_2O_3$ and CaO may be used in combination with variations in the oxides of the above elements to improve manufacturing attributes. While not necessarily a condition needed for the compositions herein, some embodiments satisfy the criterion:

$-5$ mol % $\leq Na_2O+K_2O-Al_2O_3-MgO-ZnO \leq 4$ mol %.

Other embodied glass compositions comprise an alkali aluminosilicate glass comprising at least about 4 mol % $P_2O_5$ and less than about 1 mol % $B_2O_3$ and wherein:

$0.6<[M_2O_3(\text{mol \%})/R_xO(\text{mol \%})]<1.4$; or      i.

$1.3<[(P_2O_5+R_2O)/M_2O_3] \leq 2.3$;      ii.

where $M_2O_3=Al_2O_3+B_2O_3$, $R_xO$ is the sum of monovalent and divalent cation oxides present in the alkali aluminosilicate glass, and $R_2O$ is the sum of monovalent cation oxides present in the alkali aluminosilicate glass. Particular compositions that meet the above criteria and are embodied herein include alkali aluminosilicate glasses comprising:

about 40 mol % to about 70 mol % $SiO_2$;

about 11 mol % to about 25 mol % $Al_2O_3$;

about 4 mol % to about 15 mol % $P_2O_5$;

0 mol % to less than about 1 mol % $B_2O_3$; and about 13 mol % to about 25 mol % $Na_2O$.

or, alternatively:

about 50 mol % to about 65 mol % $SiO_2$;

about 14 mol % to about 20 mol % $Al_2O_3$;

0 mol % to less than about 1 mol % $B_2O_3$;

about 4 mol % to about 10 mol % $P_2O_5$; and about 14 mol % to about 20 mol % $Na_2O$.

In some embodiments, the glasses above satisfy the equation $0.6<[M_2O_3 \text{ (mol \%)}/R_xO \text{ (mol \%)}]<1.4$ or $0.6<[M_2O_3 \text{ (mol \%)}/R_xO \text{ (mol \%)}]<1$. In other cases, the embodied glass satisfies $1.3<[(P_2O_5+R_2O)/M_2O_3]\leq 2.3$, or $1.5<[(P_2O_5+R_2O)/M_2O_3]\leq 2.0$. Embodiments may further meet one or more of the criteria that the alkali aluminosilicate glass further comprises less than 1 mol % $K_2O$ or the monovalent and divalent cation oxides are selected from the group consisting of $Li_2O$, $Na_2O$, $K_2O$, $Rb_2O$, $Cs_2O$, MgO, CaO, SrO, BaO, and ZnO.

Specific example glass compositions embodied herein are shown in TABLE 1, a compilation of some of the compositions shown in Tables 1 and 2 from U.S. application Ser. No. 12/856,840 and Table 1 of U.S. application Ser. No. 13/533,298, and TABLE 2, which shows a cross-section of compositions embodied herein that are shown in Tables 1 and 2 from U.S. application Ser. No. 13/677,805, all of which are hereby incorporated by reference in their entireties. All values are in mol % unless otherwise stated.

TABLE 1

| Sample | $SiO_2$ | $Al_2O_3$ | $B_2O_3$ | $Na_2O$ | $K_2O$ | MgO | CaO | ZnO | $SnO_2$ |
|---|---|---|---|---|---|---|---|---|---|
| 1 | 67.34 | 12.33 | 0 | 20.33 | 0 | 0 | 0 | | 0 |
| 2 | 67.85 | 9.21 | 0.54 | 14.16 | 2.34 | 5.22 | 0.46 | | 0.19 |
| 3 | 68.07 | 9.72 | 0.57 | 13.21 | 2.31 | 5.39 | 0.54 | | 0.18 |
| 4 | 68.68 | 9.54 | 0.56 | 12.92 | 2.27 | 5.29 | 0.53 | | 0.18 |
| 5 | 69.25 | 9.03 | 0.39 | 13.41 | 2.21 | 5.04 | 0.47 | | 0.18 |
| 6 | 70.25 | 8.86 | 0 | 13.43 | 1.67 | 5.18 | 0.41 | | 0.17 |
| 7 | 70.19 | 8.6 | 0 | 14.28 | 1.19 | 5.1 | 0.44 | | 0.18 |
| 8 | 70.72 | 8.67 | 0 | 13 | 2.16 | 5.19 | 0.05 | | 0.17 |
| 9 | 69.96 | 8.60 | 0.55 | 14.03 | 1.21 | 4.97 | 0.45 | | 0.20 |
| 10 | 69.85 | 8.71 | 0.05 | 14.27 | 1.26 | 5.18 | 0.47 | | 0.19 |
| 11 | 69.86 | 8.65 | 0.03 | 14.17 | 1.2 | 5.05 | 0.49 | | 0.18 |
| 12 | 70.11 | 8.68 | 0.03 | 14.22 | 1.2 | 5.06 | 0.49 | | 0.18 |
| 13 | 69.25 | 9.03 | 0.39 | 13.41 | 2.21 | 5.04 | 0.47 | | 0.18 |
| 14 | 69.41 | 8.55 | 0 | 14.05 | 1.19 | 6.17 | 0.44 | | 0.19 |
| 15 | 70.92 | 8.52 | 0 | 13.7 | 1.17 | 5.11 | 0.36 | | 0.19 |
| 16 | 64.87 | 9.18 | 0.8 | 14.42 | 4.99 | 5.5 | 0.07 | | 0.15 |
| 17 | 72.16 | 8.13 | 0 | 13.27 | 1.03 | 4.81 | 0.42 | | 0.16 |
| 18 | 73.51 | 7.6 | 0 | 11.58 | 2.3 | 4.2 | 0.6 | | 0.2 |
| 19 | 73.14 | 7.19 | 0 | 12.54 | 2.16 | 4.72 | 0.05 | | 0.18 |
| 20 | 73.52 | 7.6 | 0 | 13.87 | 0 | 4.2 | 0.61 | | 0.2 |
| 21 | 65 | 11.25 | 0.6 | 14.25 | 2.35 | 5.75 | 0.6 | | 0.2 |
| 22 | 64 | 12.25 | 0.6 | 14.25 | 2.35 | 5.75 | 0.6 | | 0.2 |
| 23 | 64 | 11.25 | 0.6 | 14.25 | 2.35 | 5.75 | 1.6 | | 0.2 |
| 24 | 62 | 12.25 | 0.6 | 14.25 | 2.35 | 5.75 | 2.6 | | 0.2 |
| 25 | 66 | 12.25 | 0.6 | 14.25 | 0.35 | 3.75 | 2.6 | | 0.2 |
| 26 | 69.19 | 8.52 | 0 | 13.94 | 1.17 | 6.44 | 0.54 | | 0.19 |
| 27 | 66 | 11.3 | 0.6 | 14.2 | 1.4 | 5.7 | 0.6 | | 0.2 |
| 28 | 72.55 | 8.2 | 0 | 11.8 | 2.3 | 4.35 | 0.6 | | 0.2 |
| 29 | 71.6 | 8.85 | 0 | 12 | 2.3 | 4.45 | 0.6 | | 0.2 |
| 30 | 70.7 | 9.45 | 0 | 12.2 | 2.3 | 4.55 | 0.6 | | 0.2 |
| 31 | 69.75 | 10.05 | 0 | 12.4 | 2.3 | 4.7 | 0.6 | | 0.2 |
| 32 | 69.87 | 8.77 | 0.56 | 12.67 | 2.27 | 5.14 | 0.53 | | 0.18 |
| 33 | 71.04 | 8 | 0.56 | 12.42 | 2.27 | 4.99 | 0.53 | | 0.18 |
| 34 | 72.22 | 7.22 | 0.56 | 12.17 | 2.27 | 4.84 | 0.53 | | 0.18 |
| 35 | 70.43 | 8.77 | 0 | 12.67 | 2.27 | 5.14 | 0.53 | | 0.18 |
| 36 | 71.61 | 7.99 | 0 | 12.42 | 2.27 | 4.99 | 0.53 | | 0.18 |
| 37 | 72.78 | 7.22 | 0 | 12.17 | 2.27 | 4.84 | 0.53 | | 0.18 |
| 38 | 71.61 | 7.99 | 0 | 12.95 | 2.27 | 4.99 | 0 | | 0.18 |
| 39 | 72.22 | 7.22 | 0 | 12.17 | 3.36 | 4.84 | 0 | | 0.18 |
| 40 | 72.22 | 7.22 | 0 | 14.26 | 2.27 | 3.84 | 0 | | 0.18 |
| 41 | 72.22 | 7.22 | 0 | 13.26 | 3.27 | 3.84 | 0 | | 0.18 |
| 42 | 73.5 | 7.6 | 0 | 12.75 | 1.15 | 4.2 | 0.6 | | 0.2 |
| 43 | 73.5 | 7.6 | 0 | 13.9 | 0 | 4.2 | 0.6 | | 0.2 |
| 44 | 72.55 | 8.2 | 0 | 12.95 | 1.15 | 4.35 | 0.6 | | 0.2 |
| 45 | 72.55 | 8.2 | 0 | 14.1 | 0 | 4.35 | 0.6 | | 0.2 |
| 46 | 73.94 | 7.65 | 0 | 13.98 | 0 | 4.23 | 0 | | 0.2 |
| 47 | 72.98 | 8.25 | 0 | 14.19 | 0 | 4.38 | 0 | | 0.2 |
| 48 | 73.5 | 7.6 | 0 | 11.6 | 2.3 | 4.2 | 0.6 | | 0.2 |
| 49 | 62.93 | 12.99 | 5 | 16.98 | 2 | 0 | 0 | | 0.1 |
| 50 | 67.73 | 9.7 | 0.62 | 13.3 | 2.37 | 5.54 | 0.48 | | 0.18 |
| 51 | 68.67 | 8.54 | 0.56 | 13.96 | 2.27 | 5.29 | 0.53 | | 0.18 |
| 52 | 71.15 | 7.78 | 0.51 | 12.93 | 2.09 | 4.87 | 0.49 | | 0.18 |
| 53 | 71.16 | 8.03 | 0 | 13.18 | 2.09 | 4.87 | 0.49 | | 0.18 |
| 54 | 68.67 | 9.68 | 0 | 13.37 | 2.27 | 5.29 | 0.53 | | 0.18 |
| 55 | 68.67 | 9.54 | 0 | 13.51 | 2.27 | 5.29 | 0.53 | | 0.18 |
| 56 | 71.27 | 8.24 | 0 | 12.9 | 2.08 | 4.85 | 0.48 | | 0.17 |
| 57 | 67.2 | 12.31 | 0 | 20.29 | 0 | 0 | 0 | | 0.2 |
| 58 | 67.01 | 12.35 | 0.36 | 20.08 | 0 | 0 | 0 | | 0.2 |
| 59 | 66.82 | 12.38 | 0.72 | 19.88 | 0 | 0 | 0 | | 0.2 |
| 60 | 68.32 | 11.82 | 0.69 | 18.97 | 0 | 0 | 0 | | 0.2 |
| 61 | 67.77 | 10.84 | 0.36 | 20.83 | 0 | 0 | 0 | | 0.2 |
| 62 | 67.57 | 10.88 | 0.72 | 20.63 | 0 | 0 | 0 | | 0.2 |
| 63 | 67.2 | 11.31 | 0 | 19.29 | 0 | 2 | 0 | | 0.2 |
| 64 | 67.02 | 11.34 | 0.36 | 19.08 | 0 | 2 | 0 | | 0.2 |
| 65 | 66.82 | 11.38 | 0.72 | 18.88 | 0 | 2 | 0 | | 0.2 |
| 66 | 68.7 | 10.74 | 0 | 18.36 | 0 | 2 | 0 | | 0.2 |
| 67 | 68.52 | 10.78 | 0.34 | 18.16 | 0 | 2 | 0 | | 0.2 |
| 68 | 68.31 | 10.82 | 0.69 | 17.98 | 0 | 2 | 0 | | 0.2 |
| 69 | 66.14 | 10.19 | 0.58 | 14.16 | 2.37 | 5.75 | 0.59 | | 0.21 |
| 70 | 66 | 12.3 | 0.6 | 14.2 | 0.35 | 4.75 | 1.6 | | 0.2 |
| 71 | 68.67 | 10.04 | 0.56 | 12.46 | 2.27 | 5.29 | 0.53 | | 0.18 |
| 72 | 69.06 | 9.59 | 0 | 13.03 | 2.28 | 5.32 | 0.53 | | 0.18 |
| 73 | 68.7 | 11.74 | 0 | 19.36 | 0 | 0 | 0 | | 0.2 |
| 74 | 68.52 | 11.78 | 0.34 | 19.16 | 0 | 0 | 0 | | 0.2 |
| 75 | 67.96 | 13.05 | 0 | 18.79 | 0 | 0 | 0 | | 0.2 |
| 76 | 67.78 | 13.08 | 0.36 | 18.58 | 0 | 0 | 0 | | 0.2 |
| 77 | 67.58 | 13.12 | 0.72 | 18.38 | 0 | 0 | 0 | | 0.2 |
| 78 | 69.57 | 8.43 | 0 | 13.95 | 1.16 | 6.18 | 0.5 | | 0.18 |
| 79 | 69.9 | 8.3 | 0 | 13.81 | 1.15 | 6.14 | 0.49 | | 0.18 |
| 80 | 69.4 | 8.36 | 0 | 14.29 | 1.06 | 6.18 | 0.5 | | 0.18 |
| 81 | 69.95 | 8.23 | 0 | 14.01 | 1.04 | 6.07 | 0.5 | | 0.18 |
| 82 | 69.21 | 9.02 | 0 | 12.98 | 0.02 | 7.52 | 1.05 | 0 | 0.2 |
| 83 | 70.43 | 9.07 | 0 | 13.09 | 0.02 | 7.13 | 0.06 | 0 | 0.19 |
| 84 | 70.57 | 9.07 | 0 | 12.06 | 0.96 | 7.07 | 0.06 | 0 | 0.19 |
| 85 | 69.29 | 9.39 | 0 | 13.12 | 0.6 | 7.33 | 0.07 | 0 | 0.18 |
| 86 | 69.5 | 9.35 | 0 | 13.14 | 0.47 | 7.28 | 0.07 | 0 | 0.18 |
| 87 | 69.7 | 9.4 | 0 | 13.05 | 0.47 | 7.12 | 0.07 | 0 | 0.18 |
| 88 | 69.51 | 9.28 | 0 | 13.2 | 0.47 | 7.28 | 0.07 | 0 | 0.18 |
| 89 | 68.84 | 9.83 | 0 | 13.07 | 0.93 | 7.06 | 0.07 | 0 | 0.18 |
| 90 | 69.32 | 9.25 | 0 | 13.15 | 0.65 | 7.36 | 0.07 | 0 | 0.18 |
| 91 | 69.86 | 10.05 | 0 | 12.61 | 0.97 | 6.23 | 0.05 | 0 | 0.19 |
| 92 | 68.62 | 9.85 | 0 | 13.74 | 0.49 | 7.04 | 0.07 | 0 | 0.18 |
| 93 | 69.88 | 9.28 | 0 | 13.01 | 0.6 | 6.97 | 0.06 | 0 | 0.18 |
| 94 | 70.17 | 9.09 | 0 | 12.02 | 0.98 | 6.53 | 1 | 0 | 0.2 |
| 95 | 68.93 | 10.23 | 0 | 14.13 | 0.01 | 6.43 | 0.07 | 0 | 0.2 |
| 96 | 71.24 | 9.25 | 0 | 12.07 | 0.98 | 6.2 | 0.05 | 0 | 0.19 |
| 97 | 66.82 | 9.48 | 0 | 14.47 | 0.78 | 8.18 | 0.08 | 0 | 0.18 |
| 98 | 68.15 | 9.75 | 0 | 14 | 0.59 | 7.25 | 0.07 | 0 | 0.18 |
| 99 | 69.63 | 9.08 | 0 | 12.97 | 0.95 | 7.09 | 0.07 | 0 | 0.2 |
| 100 | 71.3 | 9.15 | 0 | 13.05 | 0.01 | 6.23 | 0.05 | 0 | 0.19 |
| 101 | 68.17 | 9.16 | 0 | 13.98 | 0.69 | 7.74 | 0.07 | 0 | 0.18 |
| 102 | 69.52 | 9.03 | 0 | 13.04 | 0.95 | 7.18 | 0.06 | 0 | 0.19 |
| 103 | 70 | 9.35 | 0 | 13.27 | 0.49 | 6.63 | 0.06 | 0 | 0.18 |
| 104 | 71.52 | 9.06 | 0 | 12.06 | 0.97 | 6.13 | 0.05 | 0 | 0.2 |
| 105 | 71.56 | 9.06 | 0 | 13.03 | 0.02 | 6.07 | 0.06 | 0 | 0.19 |
| 106 | 69.59 | 10.04 | 0 | 13.05 | 0.96 | 6.1 | 0.05 | 0 | 0.19 |
| 107 | 69.13 | 9.86 | 0 | 13.55 | 0.76 | 6.44 | 0.07 | 0 | 0.18 |
| 108 | 69.77 | 9.47 | 0 | 12.69 | 1.11 | 6.26 | 0.49 | 0 | 0.18 |
| 109 | 69.79 | 8.48 | 0 | 12.67 | 1.12 | 7.24 | 0.49 | 0 | 0.18 |
| 110 | 69.73 | 8.5 | 0 | 13.69 | 0.17 | 7.22 | 0.48 | 0 | 0.18 |
| 111 | 69.75 | 9.48 | 0 | 13.68 | 0.15 | 6.25 | 0.48 | 0 | 0.18 |
| 112 | 69.64 | 9.14 | 0 | 12.8 | 0.97 | 6.28 | 0.96 | 0 | 0.2 |
| 113 | 68.12 | 10.29 | 0 | 15.06 | 0.02 | 6.24 | 0.05 | 0 | 0.19 |
| 114 | 68.72 | 10.18 | 0 | 14.77 | 0.02 | 6.06 | 0.05 | 0 | 0.18 |
| 115 | 68.81 | 8.85 | 0 | 13.64 | 1.09 | 7.33 | 0.06 | 0 | 0.17 |
| 116 | 69.76 | 9.57 | 0 | 12.35 | 1.91 | 6.15 | 0.06 | 0 | 0.19 |
| 117 | 68.61 | 10.17 | 0 | 14.86 | 0.02 | 6.08 | 0.05 | 0 | 0.18 |
| 118 | 68.45 | 8.46 | 0 | 13.68 | 1.12 | 7.6 | 0.49 | 0 | 0.18 |
| 119 | 68.4 | 10.14 | 0 | 14.98 | 0.01 | 6.19 | 0.07 | 0 | 0.19 |
| 120 | 68.33 | 10.13 | 0 | 15.05 | 0.02 | 6.21 | 0.06 | 0 | 0.18 |
| 121 | 70.58 | 10.06 | 0 | 13.04 | 0.96 | 5.1 | 0.05 | 0 | 0.19 |
| 122 | 69.12 | 10.14 | 0 | 14.56 | 0.13 | 5.78 | 0.06 | 0 | 0.18 |
| 123 | 68.82 | 10.19 | 0 | 14.85 | 0.01 | 5.85 | 0.06 | 0 | 0.2 |
| 124 | 70.64 | 9.02 | 0 | 12.05 | 1.88 | 6.15 | 0.05 | 0 | 0.19 |
| 125 | 68.26 | 10.38 | 0 | 15.14 | 0.02 | 5.94 | 0.05 | 0 | 0.19 |

TABLE 1-continued

| Sample | SiO₂ | Al₂O₃ | B₂O₃ | Na₂O | K₂O | MgO | CaO | ZnO | SnO₂ |
|---|---|---|---|---|---|---|---|---|---|
| 126 | 68.55 | 10.4 | 0 | 15.04 | 0.01 | 5.73 | 0.06 | 0 | 0.2 |
| 127 | 70.58 | 9.01 | 0 | 13.06 | 0.96 | 6.14 | 0.05 | 0 | 0.19 |
| 128 | 69.18 | 10.27 | 0 | 14.7 | 0.01 | 5.57 | 0.06 | 0 | 0.2 |
| 129 | 70.65 | 8.06 | 0 | 13.02 | 0.97 | 7.03 | 0.06 | 0 | 0.19 |
| 130 | 68.28 | 10.61 | 0 | 14.34 | 0.81 | 5.68 | 0.08 | 0 | 0.19 |
| 131 | 70.74 | 8.49 | 0 | 13.63 | 0.17 | 6.28 | 0.49 | 0 | 0.18 |
| 132 | 68.44 | 10.44 | 0 | 15.12 | 0.05 | 5.69 | 0.05 | 0 | 0.19 |
| 133 | 70.09 | 9.08 | 0 | 14.31 | 0.01 | 6.23 | 0.07 | 0 | 0.2 |
| 134 | 68.03 | 10.08 | 0 | 15.33 | 0.04 | 6.26 | 0.06 | 0 | 0.18 |
| 135 | 68.36 | 10.14 | 0 | 15.19 | 0.02 | 6.04 | 0.05 | 0 | 0.18 |
| 136 | 69.72 | 9.49 | 0 | 13.12 | 1.45 | 5.95 | 0.08 | 0 | 0.18 |
| 137 | 70.79 | 9.06 | 0 | 13.99 | 0.02 | 5.89 | 0.05 | 0 | 0.19 |
| 138 | 70.8 | 8.48 | 0 | 12.68 | 1.12 | 6.23 | 0.48 | 0 | 0.18 |
| 139 | 69.09 | 10.24 | 0 | 14.83 | 0.05 | 5.55 | 0.05 | 0 | 0.18 |
| 140 | 68.23 | 10.56 | 0 | 15.31 | 0.01 | 5.64 | 0.05 | 0 | 0.19 |
| 141 | 69.96 | 10.28 | 0 | 15.21 | 0.01 | 5.37 | 0 | 0 | 0.17 |
| 142 | 68.08 | 9.66 | 0 | 15 | 0.34 | 6.54 | 0.17 | 0 | 0.18 |
| 143 | 68.46 | 10.53 | 0 | 14.71 | 0.49 | 5.54 | 0.07 | 0 | 0.19 |
| 144 | 68.8 | 9.48 | 0 | 13.67 | 1.11 | 6.23 | 0.48 | 0 | 0.18 |
| 145 | 69.09 | 9.79 | 0 | 14.86 | 0.01 | 5.98 | 0.05 | 0 | 0.2 |
| 146 | 68.06 | 9.95 | 0 | 15.28 | 0.13 | 6.28 | 0.09 | 0 | 0.18 |
| 147 | 67.29 | 11.27 | 0 | 15.82 | 0.01 | 5.35 | 0.05 | 0 | 0.2 |
| 148 | 68.54 | 10.14 | 0 | 15.18 | 0.01 | 5.89 | 0.05 | 0 | 0.18 |
| 149 | 66.37 | 12.04 | 0 | 16.29 | 0.01 | 5.03 | 0.05 | 0 | 0.21 |
| 150 | 68.74 | 10.22 | 0 | 15.12 | 0.01 | 5.66 | 0.05 | 0 | 0.18 |
| 151 | 68.62 | 10.2 | 0 | 14.97 | 0.24 | 5.71 | 0.05 | 0 | 0.19 |
| 152 | 71.42 | 8.97 | 0 | 12.46 | 1.36 | 5.54 | 0.06 | 0 | 0.18 |
| 153 | 64.42 | 13.5 | 0 | 17.28 | 0.01 | 4.54 | 0.05 | 0 | 0.2 |
| 154 | 68.34 | 10.43 | 0 | 15.13 | 0.2 | 5.62 | 0.05 | 0 | 0.19 |
| 155 | 62.63 | 14.99 | 0 | 18.22 | 0.01 | 3.91 | 0.04 | 0 | 0.2 |
| 156 | 68.94 | 10.1 | 0 | 15.07 | 0.01 | 5.62 | 0.05 | 0 | 0.18 |
| 157 | 70.67 | 8.16 | 0 | 12.78 | 0.97 | 6.22 | 0.99 | 0 | 0.2 |
| 158 | 70.67 | 9.17 | 0 | 12.83 | 0.95 | 5.19 | 0.98 | 0 | 0.2 |
| 159 | 68.21 | 10.54 | 0 | 15.31 | 0.16 | 5.51 | 0.05 | 0 | 0.19 |
| 160 | 69.83 | 8.49 | 0 | 13.19 | 1.12 | 6.19 | 0.98 | 0 | 0.18 |
| 161 | 69.78 | 8.49 | 0 | 13.67 | 1.12 | 6.66 | 0.07 | 0 | 0.18 |
| 162 | 68.41 | 10.45 | 0 | 15.15 | 0.31 | 5.42 | 0.05 | 0 | 0.19 |
| 163 | 69.2 | 10.19 | 0 | 15.08 | 0.01 | 5.27 | 0.05 | 0 | 0.18 |
| 164 | 68.21 | 10.65 | 0 | 15.61 | 0.01 | 5.26 | 0.06 | 0 | 0.2 |
| 165 | 69.57 | 9.02 | 0 | 13.99 | 0.96 | 6.2 | 0.06 | 0 | 0.19 |
| 166 | 69.38 | 10.16 | 0 | 15.03 | 0.01 | 5.15 | 0.06 | 0 | 0.2 |
| 167 | 69.62 | 10.1 | 0 | 14.93 | 0.01 | 5.1 | 0.05 | 0 | 0.18 |
| 168 | 68.55 | 10.39 | 0 | 15.07 | 0.42 | 5.3 | 0.05 | 0 | 0.19 |
| 169 | 69.6 | 9.06 | 0 | 13.07 | 1.92 | 6.09 | 0.05 | 0 | 0.19 |
| 170 | 69.71 | 8.03 | 0 | 13.01 | 1.92 | 7.07 | 0.06 | 0 | 0.2 |
| 171 | 69.32 | 10.08 | 0 | 15.12 | 0.01 | 5.23 | 0.05 | 0 | 0.18 |
| 172 | 69.26 | 8.54 | 0 | 13.82 | 1.12 | 6.55 | 0.52 | 0 | 0.18 |
| 173 | 69.31 | 10.29 | 0 | 15.14 | 0.01 | 5.01 | 0.05 | 0 | 0.18 |
| 174 | 68.78 | 10.19 | 0 | 14.92 | 0.49 | 5.35 | 0.05 | 0 | 0.19 |
| 175 | 71.68 | 9.04 | 0 | 13.02 | 0.95 | 5.06 | 0.05 | 0 | 0.19 |
| 176 | 71.61 | 8.07 | 0 | 13.04 | 0.97 | 6.05 | 0.05 | 0 | 0.19 |
| 177 | 69.72 | 8.5 | 0 | 13.67 | 1.13 | 6.28 | 0.48 | 0 | 0.18 |
| 178 | 69.83 | 8.47 | 0 | 12.69 | 2.07 | 6.25 | 0.48 | 0 | 0.18 |
| 179 | 69.26 | 8.78 | 0 | 15.01 | 0.22 | 6.43 | 0.06 | 0 | 0.2 |
| 180 | 69.69 | 8.5 | 0 | 14.65 | 0.17 | 6.3 | 0.48 | 0 | 0.18 |
| 181 | 69.27 | 8.55 | 0 | 14.97 | 0.01 | 6.47 | 0.52 | 0 | 0.19 |
| 182 | 69.94 | 10.26 | 0 | 15.06 | 0.01 | 4.48 | 0.04 | 0 | 0.17 |
| 183 | 69.92 | 10.09 | 0 | 15.12 | 0.01 | 4.62 | 0.04 | 0 | 0.18 |
| 184 | 69.74 | 8.5 | 0 | 13.7 | 0.63 | 6.24 | 0.98 | 0 | 0.18 |
| 185 | 69.8 | 8.48 | 0 | 14.66 | 1.1 | 5.28 | 0.48 | 0 | 0.18 |
| 186 | 69.85 | 8.49 | 0 | 13.68 | 1.6 | 6.1 | 0.06 | 0 | 0.18 |
| 187 | 68.76 | 8.51 | 0 | 14.65 | 1.12 | 6.29 | 0.48 | 0 | 0.18 |
| 188 | 69.72 | 8.46 | 0 | 14.16 | 1.11 | 6.27 | 0.07 | 0 | 0.18 |
| 189 | 69.27 | 8.49 | 0 | 13.69 | 1.12 | 6.24 | 0.98 | 0 | 0.18 |
| 190 | 70.72 | 7.49 | 0 | 13.68 | 1.12 | 6.29 | 0.49 | 0 | 0.18 |
| 191 | 69.62 | 8.66 | 0 | 14.4 | 0.7 | 6.33 | 0.06 | 0 | 0.2 |
| 192 | 70.24 | 8.48 | 0 | 13.66 | 1.11 | 6.23 | 0.06 | 0 | 0.18 |
| 193 | 70.64 | 9.02 | 0 | 13.03 | 1.9 | 5.15 | 0.05 | 0 | 0.19 |
| 194 | 70.8 | 8.49 | 0 | 13.65 | 1.09 | 5.28 | 0.48 | 0 | 0.18 |
| 195 | 69.84 | 9.46 | 0 | 13.66 | 1.11 | 5.23 | 0.48 | 0 | 0.18 |
| 196 | 69.61 | 8.56 | 0 | 13.9 | 1.16 | 6.08 | 0.47 | 0 | 0.19 |
| 197 | 67.48 | 9.21 | 0 | 14.5 | 1.46 | 6.29 | 0.88 | 0 | 0.18 |
| 198 | 69.85 | 7.47 | 0 | 13.64 | 1.12 | 7.23 | 0.48 | 0 | 0.17 |
| 199 | 68.69 | 8.48 | 0 | 13.66 | 2.07 | 6.41 | 0.48 | 0 | 0.18 |
| 200 | 70.8 | 8.03 | 0 | 13.96 | 0.96 | 6 | 0.05 | 0 | 0.2 |
| 201 | 69.88 | 8.48 | 0 | 13.66 | 2.07 | 5.21 | 0.49 | 0 | 0.18 |
| 202 | 70.55 | 9.05 | 0 | 14.04 | 0.97 | 5.14 | 0.05 | 0 | 0.19 |
| 203 | 68.79 | 8.83 | 0 | 13.94 | 1.36 | 6.01 | 0.88 | 0 | 0.18 |
| 204 | 50.7 | 25.5 | 0 | 23.7 | 0.01 | 0.02 | 0.06 | 0 | 0.01 |
| 205 | 69.01 | 10.86 | 0 | 14.63 | 0.01 | 5.26 | 0.05 | 0 | 0.16 |
| 206 | 68.89 | 10.7 | 0 | 14.73 | 0.01 | 5.09 | 0.05 | 0.37 | 0.16 |
| 207 | 68.71 | 10.66 | 0 | 14.83 | 0.01 | 4.91 | 0.04 | 0.65 | 0.16 |
| 208 | 68.73 | 10.66 | 0 | 14.84 | 0.01 | 4.63 | 0.04 | 0.91 | 0.16 |
| 209 | 68.75 | 10.63 | 0 | 14.9 | 0.01 | 4.37 | 0.04 | 1.13 | 0.16 |
| 210 | 68.86 | 10.65 | 0 | 14.74 | 0.01 | 4.15 | 0.04 | 1.37 | 0.16 |
| 211 | 68.98 | 10.66 | 0 | 14.71 | 0.01 | 3.64 | 0.04 | 1.79 | 0.16 |
| 212 | 68.95 | 10.65 | 0 | 14.74 | 0.01 | 3.49 | 0.05 | 1.93 | 0.17 |
| 213 | 68.62 | 10.76 | 0 | 14.91 | 0.01 | 3.53 | 0.04 | 1.94 | 0.16 |
| 214 | 68.21 | 10.92 | 0 | 15.09 | 0.01 | 3.57 | 0.04 | 1.98 | 0.17 |
| 215 | 68.12 | 11.18 | 0 | 15.01 | 0.01 | 3.52 | 0.04 | 1.94 | 0.16 |
| 216 | 68.34 | 10.84 | 0 | 14.87 | 0.01 | 3.47 | 0.04 | 2.25 | 0.16 |
| 217 | 68.71 | 10.71 | 0 | 14.79 | 0.01 | 3.2 | 0.04 | 2.37 | 0.16 |
| 218 | 68.29 | 11 | 0 | 15.09 | 0.01 | 3 | 0.04 | 2.39 | 0.16 |
| 219 | 67.94 | 11.05 | 0 | 15.25 | 0.01 | 3.05 | 0.03 | 2.48 | 0.16 |
| 220 | 67.93 | 11.01 | 0 | 15.28 | 0.01 | 3.26 | 0.04 | 2.29 | 0.16 |

TABLE 2

| Example Number | A | B | C | D | E | F | G |
|---|---|---|---|---|---|---|---|
| SiO₂ in mol % | 61.0 | 59.0 | 57.0 | 62.0 | 60.0 | 58.0 | 58.0 |
| Al₂O₃ in mol % | 15.5 | 16.5 | 17.5 | 15.5 | 16.5 | 17.5 | 17.4 |
| P₂O₅ in mol % | 7.0 | 7.0 | 7.0 | 6.0 | 6.0 | 6.0 | 6.1 |
| Na₂O in mol % | 16.5 | 17.5 | 18.5 | 16.5 | 17.5 | 18.5 | 18.5 |
| MgO in mol % | 0.0 | 0.0 | 0.0 | 0.0 | 0.0 | 0.0 | 0.1 |
| ZnO in mol % | 0.0 | 0.0 | 0.0 | 0.0 | 0.0 | 0.0 | 0.0 |
| SnO₂ in mol % | 0.0 | 0.0 | 0.0 | 0.0 | 0.0 | 0.0 | 0.0 |
| CaO in mol % | 0.0 | 0.0 | 0.0 | 0.0 | 0.0 | 0.0 | 0.0 |
| (M₂O₃)/R$_x$O in mol % | 0.94 | 0.94 | 0.95 | 0.94 | 0.94 | 0.95 | 0.95 |
| (P₂O₅ + R₂O)/(M₂O₃) in mol % | 1.52 | 1.48 | 1.46 | 1.45 | 1.42 | 1.40 | 1.41 |
| (P₂O₅ + R$_x$O)/(M₂O₃) in mol % | 1.52 | 1.48 | 1.46 | 1.45 | 1.42 | 1.40 | 1.40 |
| Density (g/cm³) | 2.388 | 2.401 | 2.412 | 2.393 | 2.406 | 2.416 | 2.416 |
| Molar Volume (cm³/mol) | 30.41 | 30.43 | 30.47 | 30.01 | 30.03 | 30.08 | 30.08 |
| Strain Pt. (° C.) | 615 | 620 | 625 | 633 | 638 | 640 | 640 |
| Anneal Pt. (° C.) | 675 | 678 | 682 | 693 | 697 | 699 | 699 |
| Softening Pt. (° C.) | 963 | 958 | 951 | 973 | 978 | 969 | 969 |
| Temperature at 200 P Viscosity (° C.) | 1732 | 1708 | 1683 | 1752 | 1720 | 1698 | 1698 |

TABLE 2-continued

| | | | | | | | |
|---|---|---|---|---|---|---|---|
| Temperature at 35 kP Viscosity (° C.) | 1284 | 1274 | 1260 | 1304 | 1289 | 1275 | 1275 |
| Temperature at 160 kP Viscosity (° C.) | 1195 | 1186 | 1176 | 1215 | 1202 | 1191 | 1191 |
| Liquidus Temperature (° C.) | 775 | 740 | 730 | 770 | 790 | 770 | 890 |
| Liquidus Viscosity (P) | 2.91E+10 | 8.74E+10 | 4.40E+11 | 1.67E+11 | 2.46E+10 | 2.04E+11 | 7.09E+08 |

| Example Number | H | I | J | K | L | M | N |
|---|---|---|---|---|---|---|---|
| $SiO_2$ in mol % | 60.0 | 60.0 | 60.0 | 60.0 | 60.0 | 60.0 | 62.0 |
| $Al_2O_3$ in mol % | 16.0 | 16.0 | 16.0 | 16.0 | 16.0 | 16.0 | 15.0 |
| $P_2O_5$ in mol % | 5.0 | 5.0 | 6.0 | 6.0 | 7.0 | 7.0 | 5.0 |
| $Na_2O$ in mol % | 16.0 | 16.0 | 16.0 | 16.0 | 16.0 | 16.0 | 15.0 |
| MgO in mol % | 3.0 | 0.0 | 2.0 | 0.0 | 1.0 | 0.0 | 3.0 |
| ZnO in mol % | 0.0 | 3.0 | 0.0 | 2.0 | 0.0 | 1.0 | 0.0 |
| $SnO_2$ in mol % | 0.0 | 0.0 | 0.0 | 0.0 | 0.0 | 0.0 | 0.0 |
| CaO in mol % | 0.0 | 0.0 | 0.0 | 0.0 | 0.0 | 0.0 | 0.0 |
| $(M_2O_3)/R_xO$ in mol % | 0.84 | 0.84 | 0.89 | 0.89 | 0.94 | 0.94 | 0.83 |
| $(P_2O_5 + R_2O)/(M_2O_3)$ in mol % | 1.31 | 1.31 | 1.38 | 1.38 | 1.44 | 1.44 | 1.33 |
| $(P_2O_5 + R_xO)/(M_2O_3)$ in mol % | 1.50 | 1.50 | 1.50 | 1.50 | 1.50 | 1.50 | 1.53 |
| Density (g/cm³) | 2.417 | 2.453 | 2.406 | 2.428 | 2.393 | 2.404 | 2.423 |
| Molar Volume (cm³/mol) | 29.21 | 29.28 | 29.76 | 29.83 | 30.35 | 30.38 | 28.95 |
| Strain Pt. (° C.) | 643 | 621 | 623 | 619 | 611 | 621 | 680 |
| Anneal Pt. (° C.) | 696 | 681 | 684 | 681 | 675 | 683 | 730 |
| Softening Pt. (° C.) | 964 | 954.3 | 963.5 | 963.4 | 965 | 967.4 | 989.1 |
| Temperature at 200 P Viscosity (° C.) | 1668 | 1677 | 1695 | 1698 | 1714 | 1713 | 1676 |
| Temperature at 35 kP Viscosity (° C.) | 1247 | 1252 | 1268 | 1265 | 1280 | 1277 | 1252 |
| Temperature at 160 kP Viscosity (° C.) | 1162 | 1166 | 1181 | 1178 | 1193 | 1190 | 1167 |
| Liquidus Temperature (° C.) | 960 | | | | | | 1100 |
| Liquidus Viscosity (P) | 1.85E+07 | | | | | | 6.28E+05 |

| Example Number | O | P | Q | R | S | T | U |
|---|---|---|---|---|---|---|---|
| $SiO_2$ in mol % | 60.3 | 62.3 | 61.3 | 60.8 | 60.5 | 62.2 | 62.1 |
| $Al_2O_3$ in mol % | 15.9 | 14.7 | 15.7 | 16.0 | 15.9 | 14.6 | 14.6 |
| $P_2O_5$ in mol % | 5.5 | 4.9 | 5.0 | 5.0 | 5.2 | 5.0 | 5.0 |
| $Na_2O$ in mol % | 16.2 | 15.0 | 16.0 | 16.1 | 16.3 | 15.1 | 15.2 |
| MgO in mol % | 1.9 | 2.0 | 1.9 | 2.0 | 2.0 | 3.1 | 0.1 |
| ZnO in mol % | 0.0 | 0.0 | 0.0 | 0.0 | 0.0 | 0.0 | 3.0 |
| $SnO_2$ in mol % | 0.1 | 0.1 | 0.1 | 0.1 | 0.1 | 0.1 | 0.1 |
| CaO in mol % | 0.0 | 1.0 | 0.0 | 0.0 | 0.0 | 0.1 | 0.0 |
| $(M_2O_3)/R_xO$ in mol % | 0.88 | 0.82 | 0.87 | 0.88 | 0.87 | 0.80 | 0.80 |
| $(P_2O_5 + R_2O)/(M_2O_3)$ in mol % | 1.36 | 1.36 | 1.34 | 1.32 | 1.35 | 1.37 | 1.38 |
| $(P_2O_5 + R_xO)/(M_2O_3)$ in mol % | 1.48 | 1.56 | 1.46 | 1.45 | 1.47 | 1.59 | 1.59 |
| Density (g/cm³) | 2.415 | 2.415 | 2.414 | 2.417 | 2.416 | 2.413 | 2.449 |
| Molar Volume (cm³/mol) | 29.49 | 29.07 | 29.30 | 29.31 | 29.40 | 29.02 | 29.10 |
| Strain Pt. (° C.) | 632 | 644 | 638 | 639 | 636 | 652 | 614 |
| Anneal Pt. (° C.) | 688 | 695 | 694 | 696 | 694 | 702 | 671 |
| Softening Pt. (° C.) | 965.7 | 980.7 | 975.7 | 972.1 | 970.6 | 977.2 | 950 |
| Temperature at 200 P Viscosity (° C.) | 1690 | 1699 | 1703 | 1698 | 1691 | 1704 | 1702 |
| Temperature at 35 kP Viscosity (° C.) | 1267 | 1267 | 1278 | 1275 | 1269 | 1263 | 1253 |
| Temperature at 160 kP Viscosity (° C.) | 1181 | 1179 | 1191 | 1189 | 1183 | 1178 | 1167 |

| Example Number | V | W | X | Y | Z | AA | AB |
|---|---|---|---|---|---|---|---|
| $SiO_2$ in mol % | 60.0 | 60.4 | 60.2 | 62.8 | 61.3 | 61.1 | 60.9 |
| $Al_2O_3$ in mol % | 15.6 | 15.6 | 15.5 | 14.4 | 15.1 | 15.2 | 15.3 |
| $P_2O_5$ in mol % | 5.5 | 5.0 | 4.9 | 4.1 | 4.7 | 4.8 | 4.9 |
| $Na_2O$ in mol % | 16.3 | 16.4 | 16.4 | 15.6 | 15.7 | 15.8 | 15.8 |
| MgO in mol % | 2.5 | 2.5 | 2.9 | 3.0 | 3.0 | 3.0 | 3.0 |
| ZnO in mol % | 0.0 | 0.0 | 0.0 | 0.0 | 0.0 | 0.0 | 0.0 |
| $SnO_2$ in mol % | 0.1 | 0.1 | 0.1 | 0.1 | 0.1 | 0.1 | 0.1 |
| CaO in mol % | 0.0 | 0.0 | 0.1 | 0.0 | 0.0 | 0.0 | 0.0 |
| $(M_2O_3)/R_xO$ in mol % | 0.83 | 0.83 | 0.80 | 0.77 | 0.81 | 0.81 | 0.81 |

TABLE 2-continued

| | | | | | | | |
|---|---|---|---|---|---|---|---|
| $(P_2O_5 + R_2O)/(M_2O_3)$ in mol % | 1.39 | 1.37 | 1.38 | 1.37 | 1.35 | 1.35 | 1.35 |
| $(P_2O_5 + R_xO)/(M_2O_3)$ in mol % | 1.55 | 1.53 | 1.57 | 1.58 | 1.55 | 1.55 | 1.55 |
| Density (g/cm³) | 2.419 | 2.421 | 2.427 | 2.422 | 2.422 | 2.422 | 2.422 |
| Molar Volume (cm³/mol) | 29.35 | 29.17 | 29.00 | 28.58 | 28.92 | 28.98 | 29.03 |
| Strain Pt. (° C.) | 619 | 624 | 632 | 653 | 635 | 634 | 632 |
| Anneal Pt. (° C.) | 672 | 677 | 680 | 704 | 685 | 684 | 682 |
| Softening Pt. (° C.) | 954.2 | 956.8 | 952.6 | 977.4 | 963.1 | 961.8 | 957.4 |
| Temperature at 200 P Viscosity (° C.) | 1675 | 1680 | 1659 | 1709 | 1693 | 1690 | 1689 |
| Temperature at 35 kP Viscosity (° C.) | 1246 | 1255 | 1229 | 1263 | 1257 | 1256 | 1254 |
| Temperature at 160 kP Viscosity (° C.) | 1161 | 1169 | 1145 | 1176 | 1170 | 1170 | 1168 |

| Example Number | AC | AD | AE | AF | AG | AH | AI |
|---|---|---|---|---|---|---|---|
| $SiO_2$ in mol % | 61.8 | 56.9 | 60.1 | 60.2 | 60.1 | 61.1 | 61.0 |
| $Al_2O_3$ in mol % | 13.5 | 13.4 | 15.0 | 15.4 | 15.2 | 14.6 | 14.9 |
| $P_2O_5$ in mol % | 5.0 | 10.0 | 6.0 | 5.4 | 5.7 | 5.4 | 5.5 |
| $Na_2O$ in mol % | 19.5 | 19.6 | 15.7 | 15.9 | 15.9 | 15.2 | 15.5 |
| MgO in mol % | 0.0 | 0.0 | 3.0 | 3.0 | 3.0 | 3.5 | 3.1 |
| ZnO in mol % | 0.0 | 0.0 | 0.0 | 0.0 | 0.0 | 0.0 | 0.0 |
| $SnO_2$ in mol % | 0.1 | 0.1 | 0.1 | 0.1 | 0.1 | 0.1 | 0.1 |
| CaO in mol % | 0.0 | 0.0 | 0.1 | 0.1 | 0.1 | 0.1 | 0.1 |
| $(M_2O_3)/R_xO$ in mol % | 0.69 | 0.68 | 0.80 | 0.81 | 0.80 | 0.78 | 0.80 |
| $(P_2O_5 + R_2O)/(M_2O_3)$ in mol % | 1.82 | 2.21 | 1.44 | 1.38 | 1.42 | 1.41 | 1.41 |
| $(P_2O_5 + R_xO)/(M_2O_3)$ in mol % | 1.82 | 2.21 | 1.64 | 1.58 | 1.62 | 1.65 | 1.62 |
| Density (g/cm³) | 2.426 | 2.408 | 2.413 | 2.419 | 2.416 | 2.415 | 2.415 |
| Molar Volume (cm³/mol) | 28.96 | 30.85 | 29.45 | 29.23 | 29.34 | 29.10 | 29.21 |
| Strain Pt. (° C.) | 574 | 522 | 626 | 637 | 630 | 649 | 639 |
| Anneal Pt. (° C.) | 625 | 568 | 679 | 688 | 681 | 701 | 689 |
| Softening Pt. (° C.) | 872.9 | 825.1 | 947.3 | 955.1 | 949.9 | 969.4 | 961 |
| Temperature at 200 P Viscosity (° C.) | 1651 | 1587 | 1686 | 1679 | 1684 | 1678 | 1698 |
| Temperature at 35 kP Viscosity (° C.) | 1162 | 1126 | 1248 | 1253 | 1248 | 1248 | 1256 |
| Temperature at 160 kP Viscosity (° C.) | 1075 | 1040 | 1162 | 1169 | 1163 | 1163 | 1172 |
| Liquidus Temperature (° C.) | 990 | 915 | 1000 | | | | |

| Example Number | AJ | AK | AL | AM | AN | AO | AP |
|---|---|---|---|---|---|---|---|
| $SiO_2$ in mol % | 56.4 | 55.5 | 56.2 | 56.3 | 57.4 | 57.3 | 56.4 |
| $Al_2O_3$ in mol % | 17.4 | 17.4 | 16.5 | 14.5 | 16.6 | 14.5 | 16.5 |
| $P_2O_5$ in mol % | 8.0 | 8.9 | 8.0 | 7.9 | 7.0 | 6.9 | 7.9 |
| $Na_2O$ in mol % | 18.1 | 18.0 | 18.1 | 18.0 | 17.8 | 18.1 | 19.0 |
| MgO in mol % | 0.1 | 0.1 | 1.0 | 3.1 | 1.0 | 3.0 | 0.0 |
| ZnO in mol % | 0.0 | 0.0 | 0.0 | 0.0 | 0.0 | 0.0 | 0.0 |
| $SnO_2$ in mol % | 0.1 | 0.1 | 0.1 | 0.1 | 0.1 | 0.1 | 0.1 |
| CaO in mol % | 0.0 | 0.0 | 0.0 | 0.0 | 0.0 | 0.0 | 0.0 |
| $(M_2O_3)/R_xO$ in mol % | 0.96 | 0.97 | 0.86 | 0.69 | 0.88 | 0.69 | 0.87 |
| $(P_2O_5 + R_2O)/(M_2O_3)$ in mol % | 1.50 | 1.54 | 1.59 | 1.79 | 1.50 | 1.72 | 1.62 |
| $(P_2O_5 + R_xO)/(M_2O_3)$ in mol % | 1.50 | 1.55 | 1.65 | 2.00 | 1.56 | 1.93 | 1.62 |
| Density (g/cm³) | 2.41 | 2.41 | 2.42 | 2.43 | 2.42 | 2.43 | 2.42 |
| Molar Volume (cm³/mol) | 30.82 | 31.19 | 30.54 | 29.86 | 30.16 | 29.49 | 30.58 |
| Strain Pt. (° C.) | 603 | 591 | 586 | 571 | 601 | 588 | 586 |
| Anneal Pt. (° C.) | 661 | 648 | 642 | 619 | 658 | 634 | 642 |
| Softening Pt. (° C.) | 932.5 | 916.5 | 909.5 | 877.4 | 928.3 | 900.7 | 906.5 |
| Temperature at 200 P Viscosity (° C.) | 1653 | 1660 | 1641 | 1603 | 1660 | 1616 | 1644 |
| Temperature at 35 kP Viscosity (° C.) | 1227 | 1224 | 1214 | 1171 | 1233 | 1183 | 1212 |
| Temperature at 160 kP Viscosity (° C.) | 1142 | 1138 | 1128 | 1086 | 1148 | 1098 | 1126 |
| Liquidus Temperature (° C.) | 800 | | | | | | |

TABLE 2-continued

| Example Number | AQ | AR | AT | AU | AV | AW | AX |
|---|---|---|---|---|---|---|---|
| SiO$_2$ in mol % | 59.2 | 59.3 | 59.3 | 59.3 | 59.2 | 59.3 | 58.4 |
| Al$_2$O$_3$ in mol % | 15.0 | 14.8 | 15.1 | 14.8 | 14.6 | 15.1 | 16.0 |
| P$_2$O$_5$ in mol % | 6.8 | 6.8 | 6.8 | 6.8 | 6.8 | 6.7 | 6.8 |
| Na$_2$O in mol % | 15.2 | 14.9 | 15.1 | 14.9 | 14.8 | 15.2 | 15.9 |
| MgO in mol % | 3.1 | 3.0 | 3.5 | 3.6 | 3.6 | 3.6 | 2.7 |
| ZnO in mol % | 0.5 | 1.0 | 0.0 | 0.5 | 1.0 | 0.0 | 0.0 |
| SnO$_2$ in mol % | 0.1 | 0.1 | 0.1 | 0.1 | 0.1 | 0.1 | 0.1 |
| CaO in mol % | 0.1 | 0.1 | 0.1 | 0.1 | 0.1 | 0.0 | 0.0 |
| (M$_2$O$_3$)/R$_x$O in mol % | 0.80 | 0.78 | 0.81 | 0.78 | 0.75 | 0.80 | 0.86 |
| (P$_2$O$_5$ + R$_2$O)/(M$_2$O$_3$) in mol % | 1.46 | 1.47 | 1.45 | 1.46 | 1.48 | 1.45 | 1.41 |
| (P$_2$O$_5$ + R$_x$O)/(M$_2$O$_3$) in mol % | 1.71 | 1.74 | 1.69 | 1.74 | 1.80 | 1.69 | 1.58 |
| Density (g/cm$^3$) | 2.43 | 2.41 | 2.41 | 2.42 | 2.43 | 2.411 | 2.414 |
| Molar Volume (cm$^3$/mol) | 29.61 | 29.79 | 29.71 | 29.59 | 29.48 | 29.64 | 29.87 |
| Strain Pt. (° C.) | 615 | 613 | 617 | 620 | 620 | 616 | 612 |
| Anneal Pt. (° C.) | 669 | 663 | 668 | 671 | 669 | 669 | 666 |
| Softening Pt. (° C.) | 936.3 | 934.5 | 939.7 | 938.2 | 942.5 | 940.7 | 940.2 |
| Temperature at 200 P Viscosity (° C.) | 1667 | 1666 | 1663 | 1670 | 1657 | 1666 | 1661 |
| Temperature at 35 kP Viscosity (° C.) | 1241 | 1234 | 1233 | 1235 | 1216 | 1240 | 1243 |
| Temperature at 160 kP Viscosity (° C.) | 1156 | 1148 | 1147 | 1151 | 1133 | 1153 | 1158 |
| Liquidus Temperature (° C.) | | | | | | | |

| Example Number | AY | AZ | BA | BB | BC | BD | BE |
|---|---|---|---|---|---|---|---|
| SiO$_2$ in mol % | 59.2 | 58.4 | 57.9 | 57.1 | 56.5 | 56.8 | 57.4 |
| Al$_2$O$_3$ in mol % | 16.1 | 16.5 | 16.8 | 17.2 | 17.6 | 16.8 | 16.6 |
| P$_2$O$_5$ in mol % | 5.8 | 6.2 | 6.5 | 6.9 | 7.3 | 7.1 | 7.1 |
| Na$_2$O in mol % | 16.6 | 17.0 | 17.3 | 17.7 | 18.0 | 17.1 | 16.7 |
| MgO in mol % | 2.2 | 1.7 | 1.3 | 0.9 | 0.5 | 2.1 | 2.1 |
| ZnO in mol % | 0.0 | 0.0 | 0.0 | 0.0 | 0.0 | 0.0 | 0.0 |
| SnO$_2$ in mol % | 0.1 | 0.1 | 0.1 | 0.1 | 0.1 | 0.1 | 0.1 |
| CaO in mol % | 0.1 | 0.0 | 0.0 | 0.0 | 0.0 | 0.0 | 0.1 |
| (M$_2$O$_3$)/R$_x$O in mol % | 0.86 | 0.88 | 0.90 | 0.93 | 0.95 | 0.88 | 0.88 |
| (P$_2$O$_5$ + R$_2$O)/(M$_2$O$_3$) in mol % | 1.39 | 1.40 | 1.42 | 1.43 | 1.44 | 1.44 | 1.43 |
| (P$_2$O$_5$ + R$_x$O)/(M$_2$O$_3$) in mol % | 1.53 | 1.51 | 1.49 | 1.48 | 1.47 | 1.56 | 1.56 |
| Density (g/cm$^3$) | 2.418 | 2.415 | 2.416 | 2.416 | 2.414 | 2.419 | 2.415 |
| Molar Volume (cm$^3$/mol) | 29.58 | 29.86 | 30.07 | 30.30 | 30.54 | 30.14 | 30.14 |
| Strain Pt. (° C.) | 624 | 618 | 616 | 616 | 615 | 609 | 610 |
| Anneal Pt. (° C.) | 681 | 677 | 675 | 674 | 674 | 666 | 666 |
| Softening Pt. (° C.) | 954.9 | 950.5 | 948.1 | 947.9 | 949.3 | 930.8 | 940.6 |
| Temperature at 200 P Viscosity (° C.) | 1680 | 1673 | 1676 | 1670 | 1667 | 1654 | 1660 |
| Temperature at 35 kP Viscosity (° C.) | 1257 | 1253 | 1254 | 1250 | 1249 | 1235 | 1240 |
| Temperature at 160 kP Viscosity (° C.) | 1171 | 1168 | 1169 | 1166 | 1164 | 1151 | 1156 |
| Liquidus Temperature (° C.) | | 955 | | | | | |

| Example Number | BF | BG | BH | BI | BJ | BK | BL |
|---|---|---|---|---|---|---|---|
| SiO$_2$ in mol % | 58.2 | 57.8 | 57.9 | 56.8 | 56.9 | 56.9 | 56.8 |
| Al$_2$O$_3$ in mol % | 16.1 | 16.5 | 16.3 | 16.5 | 16.8 | 17.0 | 17.5 |
| P$_2$O$_5$ in mol % | 6.3 | 6.5 | 6.4 | 6.5 | 6.4 | 6.4 | 6.4 |
| Na$_2$O in mol % | 15.9 | 16.5 | 16.3 | 16.5 | 16.8 | 17.1 | 17.1 |
| MgO in mol % | 3.5 | 2.6 | 3.0 | 3.6 | 3.1 | 2.5 | 2.0 |
| ZnO in mol % | 0.0 | 0.0 | 0.0 | 0.0 | 0.0 | 0.0 | 0.0 |
| SnO$_2$ in mol % | 0.1 | 0.1 | 0.1 | 0.0 | 0.0 | 0.0 | 0.0 |
| CaO in mol % | 0.1 | 0.1 | 0.1 | 0.0 | 0.0 | 0.0 | 0.0 |
| (M$_2$O$_3$)/R$_x$O in mol % | 0.83 | 0.86 | 0.84 | 0.82 | 0.84 | 0.86 | 0.91 |
| (P$_2$O$_5$ + R$_2$O)/(M$_2$O$_3$) in mol % | 1.38 | 1.39 | 1.39 | 1.40 | 1.38 | 1.38 | 1.34 |
| (P$_2$O$_5$ + R$_x$O)/(M$_2$O$_3$) in mol % | 1.60 | 1.55 | 1.58 | 1.62 | 1.56 | 1.53 | 1.46 |
| Density (g/cm$^3$) | 2.421 | 2.419 | 2.420 | 2.426 | 2.426 | 2.424 | 2.420 |
| Molar Volume (cm$^3$/mol) | 29.58 | 29.82 | 29.72 | 29.64 | 29.70 | 29.81 | 30.00 |
| Strain Pt. (° C.) | 615 | 616 | 616 | 615 | 615 | 623 | 624 |
| Anneal Pt. (° C.) | 666 | 671 | 670 | 666 | 669 | 679 | 681 |

TABLE 2-continued

| Softening Pt. (° C.) | 937.8 | 945.7 | 941.6 | 930.6 | 933.9 | 949.7 | 952.4 |
|---|---|---|---|---|---|---|---|
| Temperature at 200 P Viscosity (° C.) | 1655 | 1658 | 1658 | 1641 | 1646 | 1646 | 1657 |
| Temperature at 35 kP Viscosity (° C.) | 1235 | 1236 | 1236 | 1224 | 1233 | 1236 | 1246 |
| Temperature at 160 kP Viscosity (° C.) | 1152 | 1154 | 1154 | 1141 | 1151 | 1152 | 1162 |

The compressive layer (or layers) of the glass article may be formed by ion exchanging the glass article as shown, for example in U.S. application Ser. Nos. 12/856,840 and 13/533,298, both of which are hereby incorporated by reference in their entireties. In a particular embodiment, ion exchange is carried out by immersing the glass article in a molten salt bath substantially comprising potassium nitrate ($KNO_3$). The ion exchange bath may also comprise up to about 0.6 mol % and, in some embodiments, up to about 0.2 mol % sodium nitrate ($NaNO_3$). As used herein, the term "substantially comprising" means that other components may be present in the molten salt bath. Such components may include, but are not limited to, compounds that act to reduce attack of the bath vessel or the glass article by the molten salt. Such additional components may include, but are not limited to, selected components of the glass, such as silicic acid, alumina in gel form, silica in gel form, or the like.

An embodiment comprises a method of strengthening an alkali aluminosilicate glass, the method comprising: providing an alkali aluminosilicate glass as described above, and immersing the alkali aluminosilicate glass in an ion exchange bath for a time period from about 15 minutes to up to about 24 hours to form a compressive layer extending from a surface of the alkali aluminosilicate glass to a depth of layer of from about 10 µm to about 40 µm, about 10 µm to about 35 µm, about 10 µm to about 30 µm, about 10 µm to about 25 µm, about 10 µm to about 20 µm, about 15 µm to about 35 µm, about 15 µm to about 30 µm, about 15 µm to about 25 µm, or about 15 µm to about 20 µm.

The temperature of the molten salt bath in which the aluminosilicate glass article described herein is immersed is less than or equal to about 420° C., in other embodiments, less than or equal to about 415° C., and, is still other embodiments, less than about 410° C. This temperature may be determined, for example, by embedding or otherwise containing a suitable thermocouple within an electrically insulating sheath and submerging the thermocouple in the molten salt bath at a depth roughly corresponding to the depth at which the glass article will be immersed during the ion exchange process. The glass article is immersed in the $KNO_3$ ion exchange bath for a time period of up to, in some embodiments, about eight hours. In other embodiments, the glass article is immersed in the $KNO_3$ ion exchange bath for a time period from about 15 minutes to about 16 hours.

The process of annealing a glass causes the rate of ion exchange of the glass article to increase while causing the compressive stress of the compressive layer to increase. Due to the increase in ion exchange time, however, it is often impractical to take advantage of such an annealing process. In addition, ion exchange at lower temperatures reduces the rate of stress relaxation of the ion exchanged glass, thereby increasing the compressive stress in the glass article. However, ion exchange at lower temperature decreases the rate of ion exchange, thus making it impractical to carry out ion exchange at lower temperature due to the long times required to ion exchange the glass to a desired depth of layer.

In some embodiments, the aluminosilicate glass described herein is annealed prior to ion exchange. Unless otherwise specified, "anneal" means holding the glass a temperature that is between the strain point and glass transition temperature Tg of the glass for a period of up to about two hours and then cooled at a rate of up to about 1° C./minute to room temperature (i.e., about 25° C.). Alternatively, the aluminosilicate glass may be rapidly cooled (i.e., at a rate of at least about 4° C./second) from a high temperature to a temperature below the strain point of the glass or directly to room temperature. Such rapid cooling may occur when the glass is formed by a down draw process such as slot or fusion draw processes. The aluminosilicate glass article is typically heated to a first temperature that is greater than the anneal point of the glass to increase the volume of the glass, and then quenched to a second temperature that is less than the strain point of the glass. In one embodiment in which the glass article is molten, the melt is heated to a temperature that is greater than the anneal point and quenched by down-drawing the glass using, for example, slot-draw or fusion-draw processes, to form a sheet. In other embodiments, a solid glass article is heated to a temperature above the anneal point of the glass and then quenched to a temperature below the strain point of the glass.

FIG. 1 schematically provides a cross-sectional view of a portion (i.e., ends of the glass sheet are not shown) of a glass sheet strengthened by ion exchange. In the non-limiting example shown in FIG. 1, strengthened glass sheet 100 has a thickness t, central portion 130, and a first surface 110 and second surface 112 that are substantially parallel to each other. Compressive layers 120, 122 extend from first surface 110 and second surface 112, respectively, to depths of layer $d_1$, $d_2$ below each surface. Compressive layers 120, 122 are under a compressive stress, while central portion 130 is under a tensile stress, or in tension. The tensile stress in central portion 130 balances the compressive stresses in compressive layers 120, 122, thus maintaining equilibrium within strengthened glass sheet 100. In some embodiments, the glasses and glass articles described herein may be ion exchanged to achieve a compressive stress of at least about 600 MPa and/or a depth of compressive layer of from about 15 µm to about 50 µm, and have an IFT of from about 10 to about 20 kg or more. In some embodiments, the glasses and glass articles described herein may be ion exchanged to achieve a compressive stress of at least about 500 MPa and/or a depth of compressive layer of at least about 40 µm. In some embodiments, the glass is ion exchanged to achieve a compressive stress of at least about 500, 550, 600, 625, 650, 675, 700, 750, 800, or 1000 MPa.

In some embodiments, the glass is ion exchanged to achieve a depth of layer from about 10 µm to about 40 µm, about 10 µm to about 35 µm, about 10 µm to about 30 µm, about 10 µm to about 25 µm, about 10 µm to about 20 µm, about 15 µm to about 35 µm, about 15 µm to about 30 µm, about 15 µm to about 25 µm, about 15 µm to about 20 µm, about 15 µm to about 50 µm, about 20 µm to about 45 µm, or about 25 µm to about 40 µm. The depth of layer in some embodiments may be about 10 µm, 15 µm, 20 µm, 25 µm, 30 µm, 35 µm, 40 µm, 45 µm, or 50 µm or may fall within a range defined by these values or any numerical value within these values.

In addition to the high CS at low DOL, the ion exchanged alkali aluminosilicate glasses embodied herein have an IFT when measured using a Vickers indenter of at least about 10 kg. In some embodiments, the ion exchanged alkali aluminosilicate glasses have an IFT of at least about 10, 12, 14, 16, or 18 kg. Other embodied compositions have an IFT of from about 10 to about 30 kg, about 12 to about 30 kg, about 14 to about 30 kg, or about 16 to about 30 kg.

Alternatively, the crack resistance may be measured using the Vickers indentation crack initiation load of the Vickers indenter. In some embodiments, the ion exchanged alkali aluminosilicate glasses have a Vickers indentation crack initiation load of at least about 10, 15, or 20 kgf. In some embodiments, the ion exchanged alkali aluminosilicate glasses have a Vickers indentation crack initiation load of at least about 10, 12, 14, 16, 18, 20, 25, 30, 35, 40, 45 or 50 kgf. Embodiments may have a Vickers indentation crack initiation load from about 10 to about 50 kgf, about 14 to about 50 kgf, about 18 to about 50 kgf, or about 20 to about 50 kgf.

The embodiments described herein may a CS of from about 600 to about 1200 MPa, a DOL from about 15 to about 40 µm, and an IFT from about 10 to about 40 kg. Alternatively, embodiments may have a CS of from about 600 to about 1000 MPa, a DOL from about 15 to about 30 µm, and an IFT from about 12 to about 40 kg. Still other embodiments may have a CS of from about 700 to about 1000 MPa, a DOL from about 15 to about 25 µm, and an IFT from about 14 to about 40 kg. Further embodiments may have a CS of from about 800 to about 1000 MPa, a DOL from about 15 to about 25 µm, and a Vickers indentation crack initiation load from about 12 to about 40 kgf.

As noted previously, the ion-exchanged glass compositions disclosed herein have unexpected resistance to IFT at high CS and shallow DOL. The fact that these glasses obtain a higher fracture threshold having a high CS and a shallow depth of layer relative to progressively deeper DOL is counter-intuitive to traditional understandings of IFT. While not wanting to be held to any specific theory, a mechanistic explanation of the effect of CS/DOL interplay on the IFT characteristics is attempted herein.

The deformation response of deeper DOL vs. shallower DOL at the same depth below the surface where the compressive stress of the former is higher, must be considered to account for the higher indentation fracture threshold of the latter as stated above. Kato et al., (Y. Kato et al. "Effect of densification on crack initiation under Vickers indentation test," 356 J. Non-Crystalline Solids 1768-1773 (2010) and Y. Kato et al., "Load dependence of densification in glass during Vickers indentation test," 119 J. Ceram. Soc. Japan 110-115 (2011), both of which are hereby incorporated by reference in their entireties) carried out Vickers indentation fracture testing on various commercial glasses. The permanent deformation associated with an indentation is the result of two types of responses of the glass i.e., densification and shear (or "plastic") flow. It is widely accepted that crack initiation is affected by the amount of shear flow taking place around the indentation. If shear deformation is too it may cause shear-flow related cracks. However, Kato et al. did not find any correlation between ease of deformation (as indicted by indentation hardness measurements) and crack resistance. Instead, they found a correlation between densification and crack resistance. They postulated that densification reduces the severity of stress concentration via the reduction in the interstitial space of the 3-dimensional network by a decrease in atomic bond angle and distance. In testing this theory, they found that the higher the recoverable densification, the higher the crack initiation threshold.

However, in contrast to Kato et al., in the embodied compositions it was found that the % elastic recovery is similar in both the high CS/high DOL and embodied high CS/shallow DOL (TABLE 3).

TABLE 3

| CS (MPa) | DOL (µm) | % Elastic Depth Recovery (%) | Std. Dev. (%) |
|---|---|---|---|
| 452 | 27 | 81.3 | 1.0 |
| 451 | 40 | 82.3 | 0.5 |
| 555 | 26 | 81 | 0.4 |
| 556 | 33 | 81.7 | 0.6 |
| 556 | 41 | 82 | 0.4 |
| 680 | 21 | 81.9 | 1.4 |
| 648 | 27 | 81.9 | 2.3 |
| 679 | 33 | 83.5 | 0.7 |
| 650 | 40 | 84.2 | 0.8 |

Thus is postulated that the lower cracking threshold of the higher DOL/high CS glasses compared with the embodied shallow DOL/high CS must be a result of the phenomenon of densification followed by cracking in the elastic regime. In contrast, the shallow DOL/high CS glass allowed more densification without the resulting cracking the elastic regime. Also, the volume of glass "available" for densification in the case of the "shallow DOL" is greater than in the "deep DOL" due to the composition and stress profile. This larger "free" volume is proposed to be critically responsible for the higher IFT in the "shallow DOL," but is only present when the surface CS is near and/or above about 600 MPa.

EXAMPLES

Example 1

Figure 2:
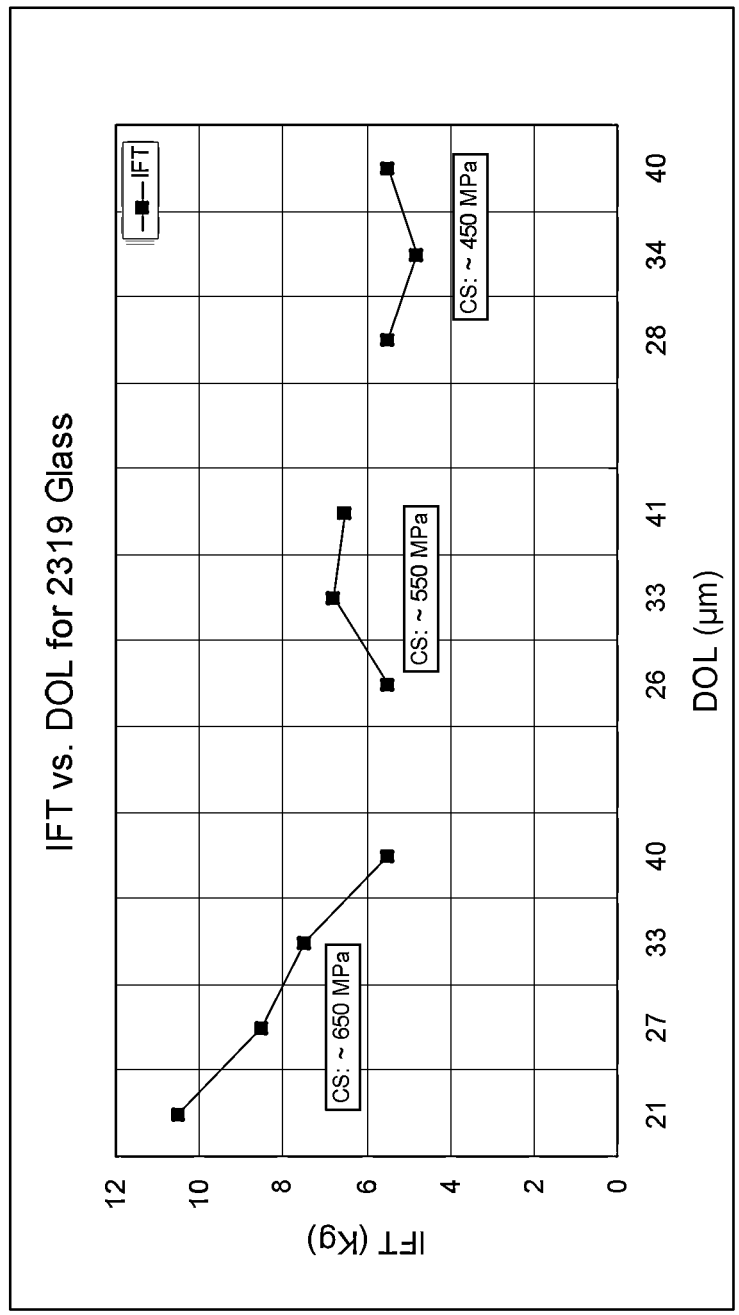
FIG. 2 shows the variation in IFT with DOL for glass sample no. 141 at three different CS levels (~450 MPa, ~550 MPa, and ~650 MPa)

TABLE 4 lists a series of example alkali aluminosilicate glass coupons made with glass sample no. 26 that have been ion-exchanged under various conditions to produce specimens with varying DOL and CS. Electron microprobe work was carried out to determine the composition profile of the glass after ion exchange. Compressive stress and DOL were obtained by using FSM data in combination with modeling. As it may be evidenced in the data, two variables were varied i.e., the CS and DOL. CS was varied between approximately 400 MPa and 700 MPa, and DOL was varied from approximately 20 to 40 µm. FIG. 2 presents a summary chart where the IFT values of glasses with a variety of combination of CS and DOL has been presented.

TABLE 4

| CS (MPa) | DOL (µm) | IFT (Kg) mean ± 1σ |
|---|---|---|
| 452 | 27 | 5.5 ± 1.0 |
| 451 | 40 | 4.8 ± 1.2 |
| 555 | 26 | 5.5 ± 0.0 |
| 556 | 33 | 6.8 ± 0.6 |
| 556 | 41 | 6.5 ± 0.0 |
| 680 | 21 | 10.5 ± 2.6 |
| 648 | 27 | 8.5 ± 0.0 |
| 679 | 33 | 7.5 ± 0.0 |
| 650 | 40 | 5.5 ± 1.0 |

Example 2

The effect shown in Example 1 is observed in other alkali aluminosilicate glasses as well, such as glass sample no. 141, when varying the CS/DOL. TABLE 5 shows these results. However, note the testing was only conducted up to 10 kg, so the actual IFT was never determined.

TABLE 5

| CS (MPa) | DOL (μm) | IFT (Kg) |
|---|---|---|
| 734 | 38 | 6.5 |
| 690 | 23 | >10 |
| 824 | 26 | >10 |

Example 3

High IFT values were also measured at even higher CS (higher than that reported in TABLE 2) and shallower DOL to confirm that observation, see TABLE 6. The data in TABLE 4 confirm that the effect of high CS/shallow DOL in improving the IFT performance of the glass compositions described herein is real.

TABLE 6

| CS (MPa) | DOL (μm) | IFT (Kg) mean ± 1σ |
|---|---|---|
| 883 | 14 | 17.5 ± 0.0 |
| 841 | 14 | 19.0 ± 3.0 |

Example 4

Glass sample no. 26 with thickness of 1 mm is chosen as the model material in order to differentiate the respective role of CS and DOL in determining IFT of ion-exchanged glass. Three types of IOX experiments are designed: (1) varied IOX time periods at fixed IOX temperature, (2) varied DOL but fixed CS to examine the effect of DOL, and (3) varied CS but fixed DOL to examine the effect of CS. Fixed CS or DOL is achieved by tuning IOX temperature and time. All the IOX experiments are performed in technical grade $KNO_3$ bath. CS and DOL are measured by FSM and a Vickers indenter is used in the IFT test.

Figure 3:
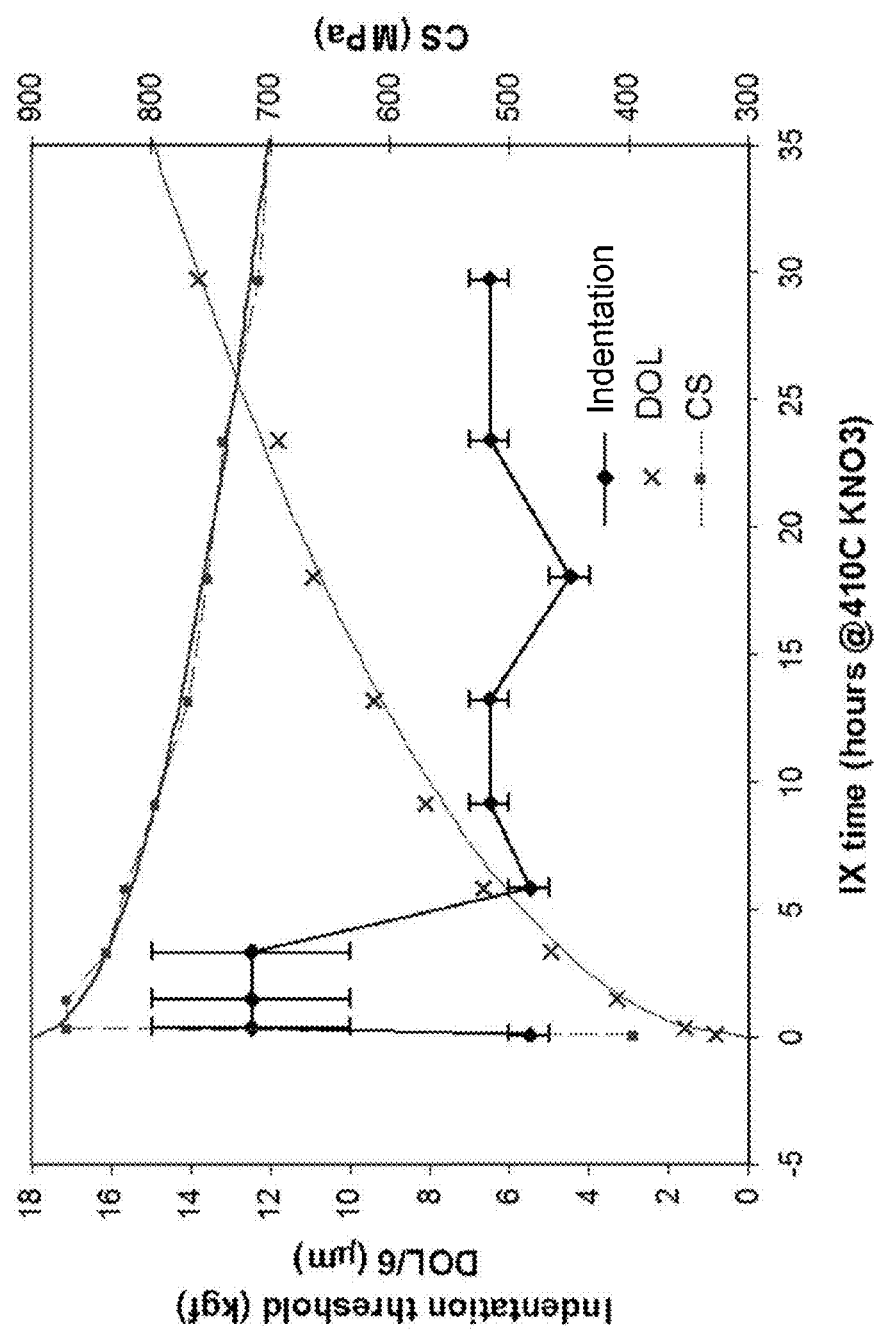
FIG. 3 provides the IOX time dependence of indentation threshold, CS, and DOL for glass sample no. 26 ion-exchanged at 410° C. in $KNO_3$ salt bath. Note that DOL is scaled with IFT.

Generally, two types of failure are observed at the IFT load depending on the extent of IOX. Radial cracks appear at the IFT load for a glass with brief IOX that produces low CS and shallow DOL. However, a glass with a greater extent of IOX breaks at the IFT load along with forming radial cracks near the indentation impression region. The IFT of glass sample no. 26 shows a non-monotonic relationship with IOX time, CS, and DOL, as shown in FIG. 3. The IFT is only ~5 kgf at a short IOX time of ~5 min, then reaches a maximum of ~17.5 kgf, and finally abruptly drops to ~6 kgf. This last value is relatively unaffected by further increases in IOX time. As shown in FIG. 3, except for the low CS at very short IOX times (~5.5 min.), both CS and DOL are a monotonic function of IOX time.

Figure 4:
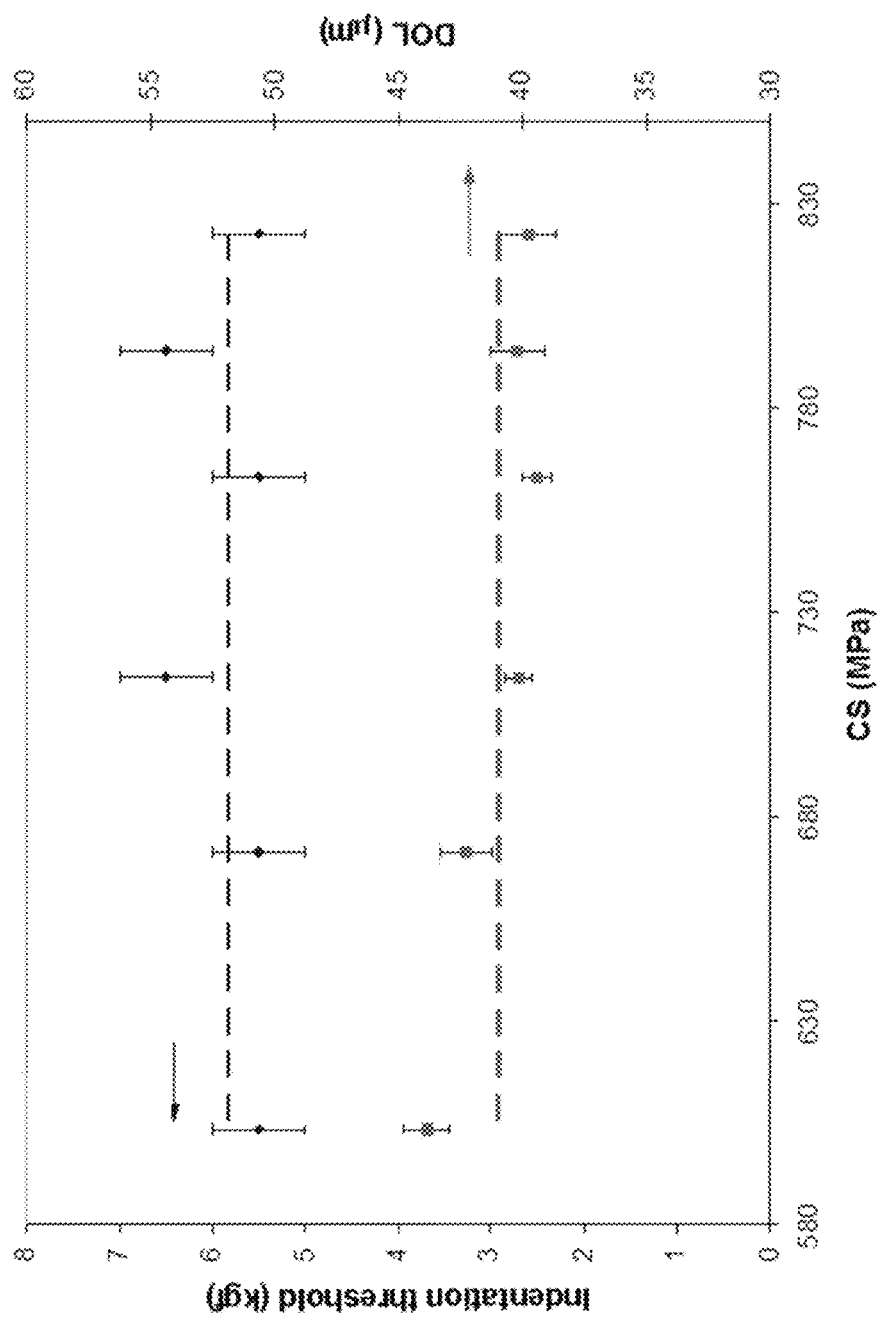
FIG. 4 shows the indentation threshold of glass sample no. 26 as a function of CS with the DOL constant at ~41 μm.
Figure 5:
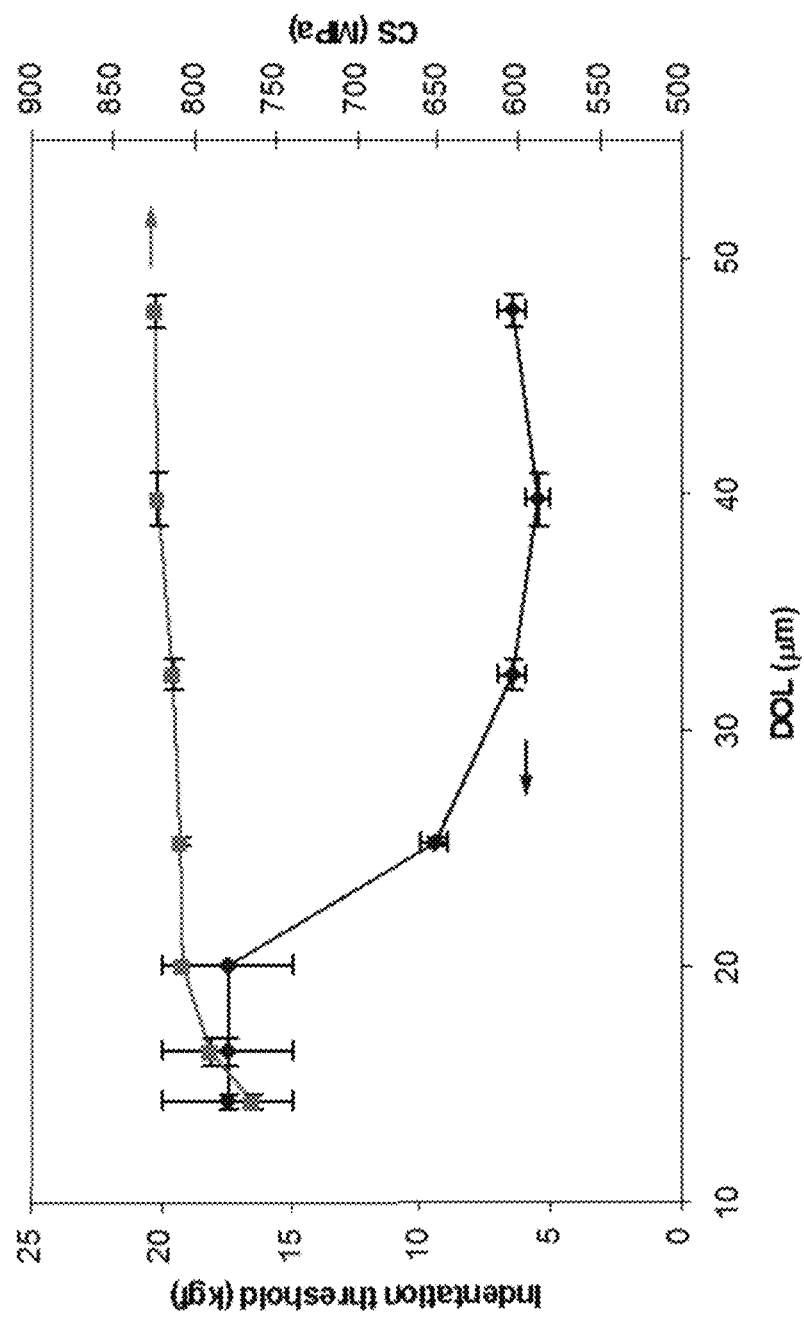
FIG. 5 describes the indentation threshold of glass sample no. 26 as a function of DOL with CS constant at ~820 MPa.
Figure 6:
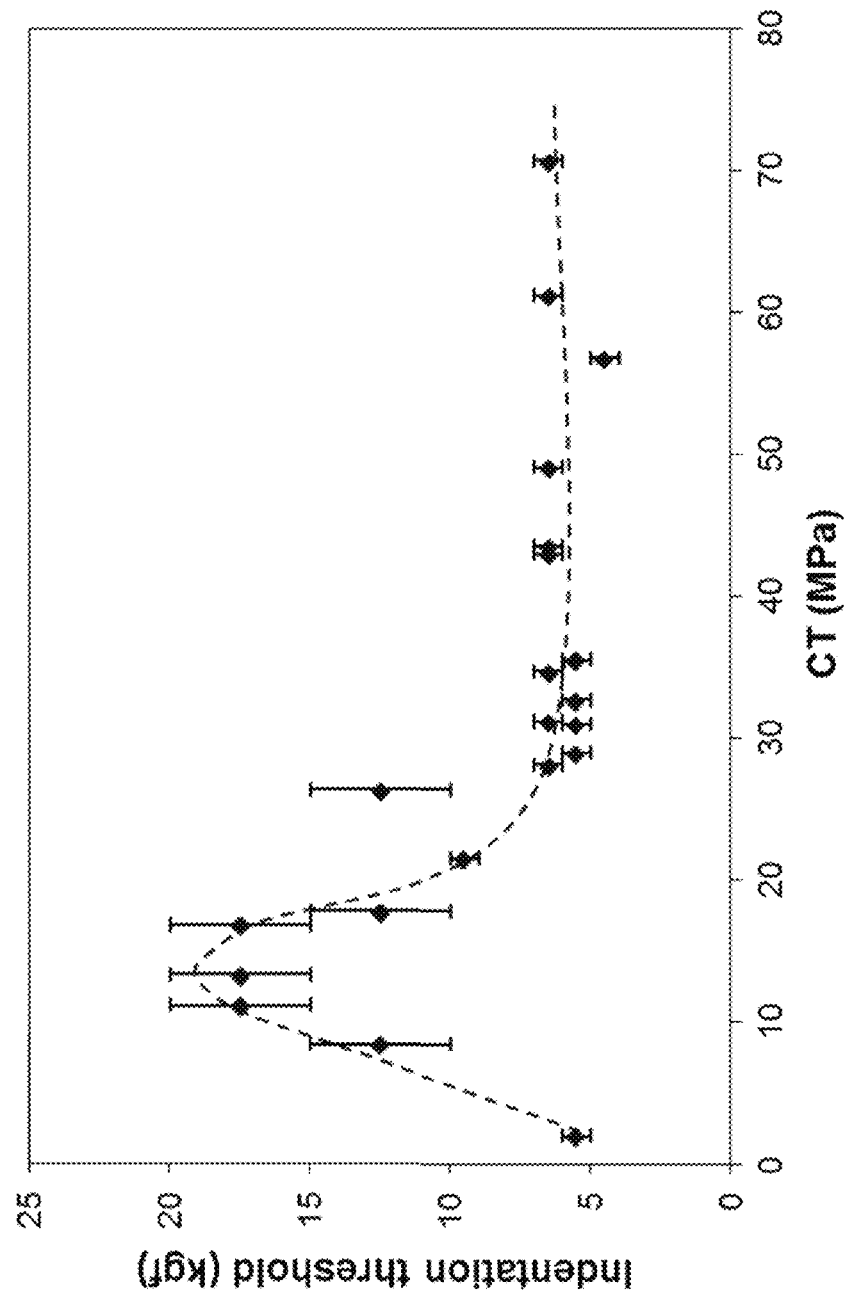
FIG. 6 is a graph of the CT dependence of indentation threshold of glass sample no. 26. Note that all the IFT data for the IOX conditions used in this work are plotted.
Figure 7:
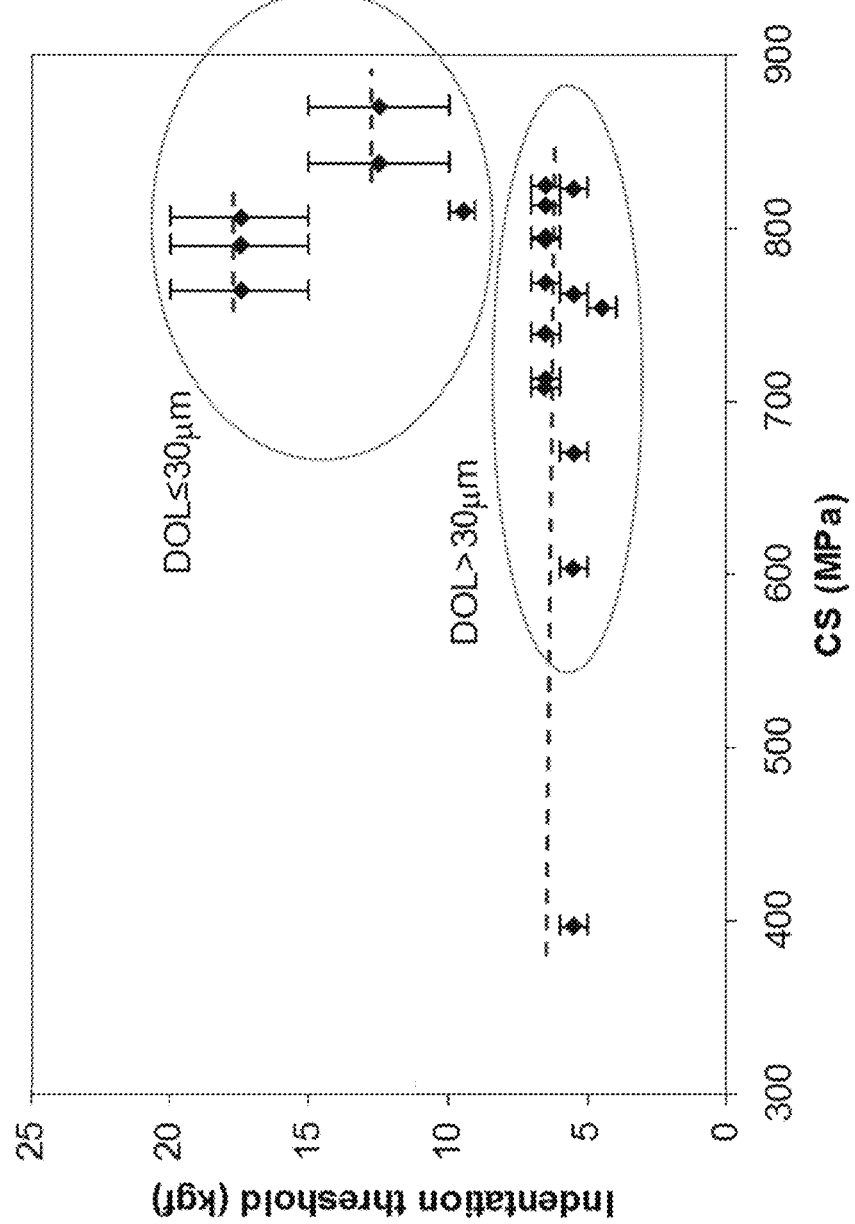
FIG. 7 provides the indentation threshold of glass sample no. 26 as a function of CS for high (>30 μm) and low (<30 μm) DOL.

The dependences of IFT on CS and DOL is further examined by setting DOL and CS, as shown in FIGS. 4 and 5, respectively. Surprisingly, the IFT of glass sample no. 26 is roughly unaffected even as the CS varies in a wide range from 600~800 MPa. The IFT of glass sample no. 26 is large when the CS is large and the DOL is shallow (<30 μm), but decreases dramatically to ~6 kgf and remains nearly unchanged as DOL increases further (FIG. 7). The effect of CT on IFT was also examined, in which all the IFT data for the IOX experiments used in this work are plotted (FIG. 6). Low, and nearly constant, IFT is found at CT>28 MPa. The IFT of glass sample no. 26 reaches a plateau when the CT is beyond a certain value, as seen in FIG. 6. This also explains the plateau region at longer IOX time in FIG. 3, at larger DOL in FIG. 5, and the independence of IFT on CS in FIG. 4.

Example 5

The quasi-static Vickers indentation threshold was examined for glass sample no. BG at the three following CS and DOL conditions for as-drawn glass: 1.) CS=959 MPa, DOL=47 microns, 2.) CS=974 MPa, DOL=25 microns, and 3.) CS=690 MPa, DOL=66 microns. The results are given in TABLE 7.

TABLE 7

| Compressive Stress (MPa) | Depth of Layer (microns) | Central Tension (MPa) | Vickers Indentation Threshold (kgf) |
|---|---|---|---|
| 959 | 47 | 50 | 15-20 |
| 974 | 25 | 26 | 40-45 |
| 690 | 66 | 52 | 10-15 |

As can be seen in TABLE 7, the Vickers indentation threshold is clearly improved for ion-exchange with DOL<30 μm and with the lowest CT value.

Figure 8:
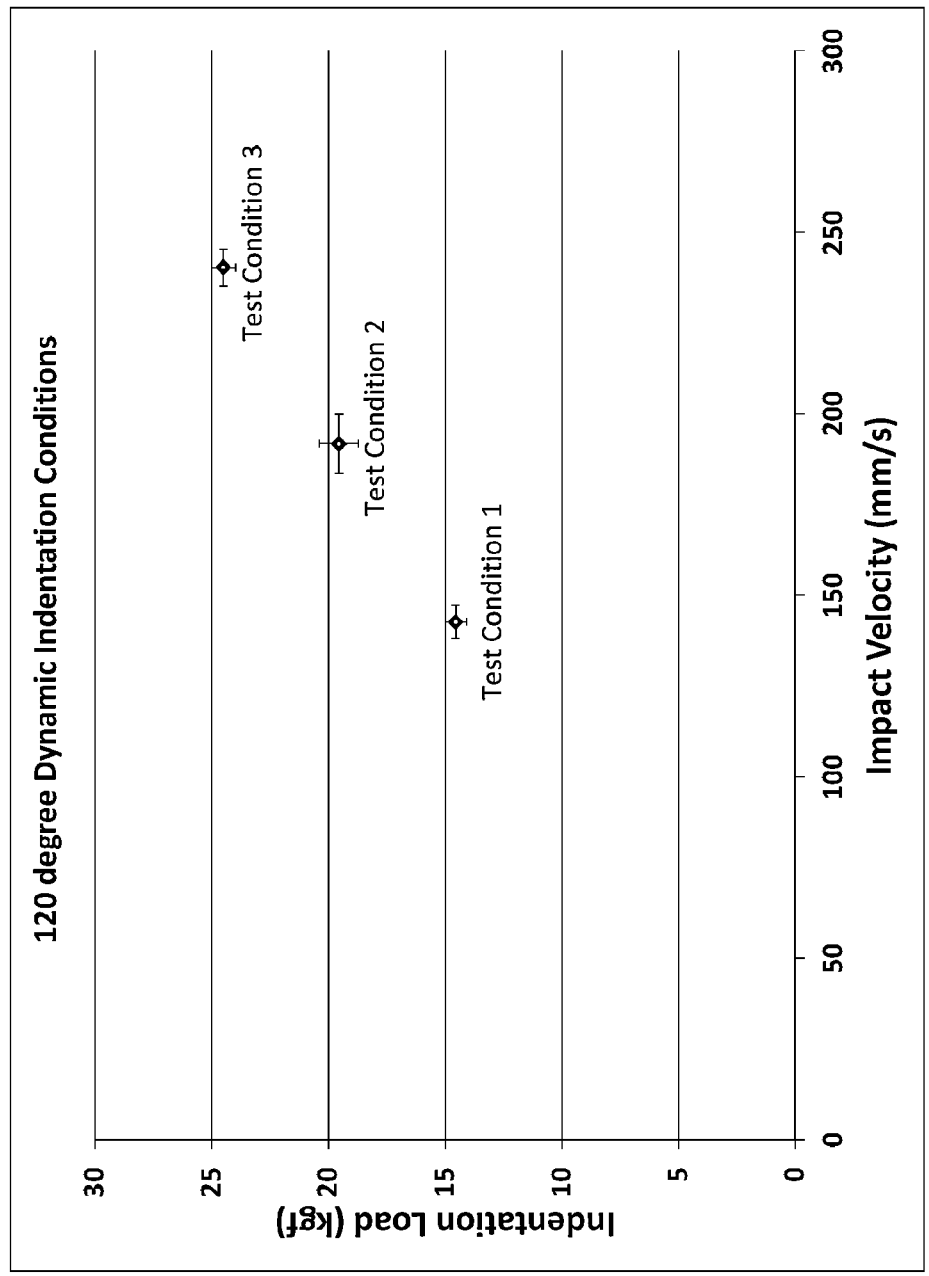
FIG. 8 shows the test conditions for 120° dynamic indentation experiments on glass sample no. BG with various CS/DOL combinations.

A dynamic indentation experiment was also performed with a sharper 120° 4-sided pyramidal indenter tip to study high rate, sharp contact failure. The intent of this test was to determine if the advantage of high CS (>750 MPa), low DOL (<30 microns) still holds under other contact conditions besides for quasi-static Vickers indentation. Three test conditions were used as shown in FIG. 8. The results of the experiment are given in TABLE 8.

TABLE 8

| | Velocity (mm/s) | Indentation Load (kgf) | As-drawn glass with CS = 959 MPa, DOL = 47 microns | As-drawn glass with CS = 974 MPa, DOL = 25 microns | As-drawn glass with CS = 690 MPa, DOL = 66 microns | Annealed glass with CS = 1064 MPa, DOL = 25 microns |
|---|---|---|---|---|---|---|
| Test Condition 1 | 143 ± 5 | 14.6 ± 0.5 | 0% Failed | 0% Failed | 100% Failed | 100% Failed |
| Test Condition 2 | 192 ± 8 | 19.6 ± 0.8 | 50% Failed | 40% Failed | | |
| Test Condition 3 | 240 ± 5 | 24.5 ± 0.5 | 100% Failed | 100% Failed | | |

The results indicate that under these test conditions there is no improvement in the high CS (974 MPa) shallow DOL (25 micron) parts when compared to high CS (959 MPa) deep DOL (46 microns) parts. Both are failing at the same or nearly the same frequency under each test condition. It is clear, however, that both as-drawn, high CS samples offer a substantial advantage over the as-drawn lower CS (690 MPa), very deep DOL (66 microns) samples who fail 100% of the time under test condition 1. The expectation is that the resistance to failure under this contact condition can be improved for samples with even higher CS at 25 micron DOL, although this may eventually be limited by the increasing CT. In an attempt to verify this theory, a samples of glass no. BG were annealed prior to ion-exchange and a CS of 1064 MPa and DOL of 25 μm was achieved, However, the resistance to failure decreased as shown by a 100% failure rate under test condition number 1. The likely cause for the reduction in resistance to failure is the removal of free volume and therefore reduction of inherent damage resistance during the annealing process.

The CS/DOL indentation experiments on glass sample BG show that the high CS/low DOL condition offers an improvement to quasi-static indentation results and give equivalent performance to the same glass (w/ same thermal history) with the same CS and deeper DOL in dynamic 120° indentation.

Example 6

Figure 9:
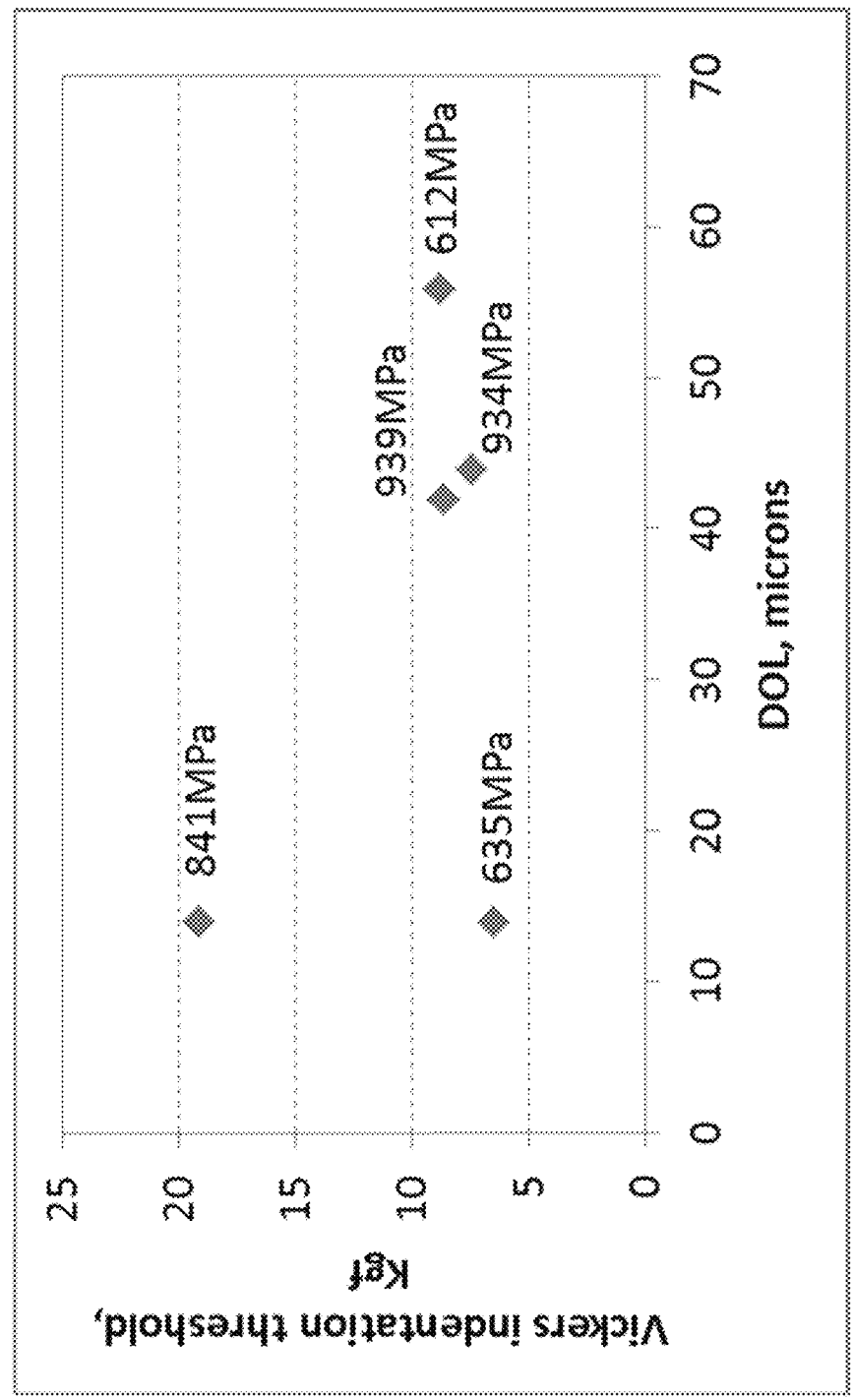
FIG. 9 shows the indentation threshold for glass sample no. 141 with different DOL/CS at different IOX conditions.

IFT versus DOL at various CS was tested in glass sample no. 141 and the results plotted in FIG. 9. As the figure shows, glass sample no. 141 showed high IFT at low DOL (~15 μm) and high (~841 MPa) values as compared to IFT values at various CS with DOLs around 40-60 μm.

While typical embodiments have been set forth for the purpose of illustration, the foregoing description should not be deemed to be a limitation on the scope of the disclosure or appended claims. Accordingly, various modifications, adaptations, and alternatives may occur to one skilled in the art without departing from the spirit and scope of the present disclosure or appended claims.

What is claimed is:

1. A glass for making a strengthened glass article, where the glass comprises an ion-exchangeable, alkali aluminosilicate glass composition comprising:

about 40 mol % to about 70 mol % $SiO_2$;

about 11 mol % to about 25 mol % $Al_2O_3$;

at least 4 mol % to about 15 $P_2O_5$;

less than about 1 mol % $B_2O_3$; and from 13 mol % to about 25 mol % $Na_2O$, wherein:

i. $0.6<[M_2O_3(mol\ \%)/R_xO(mol\ \%)]<1.4$; or ii. $1.3<[(P_2O_5+R_2O)/M_2O_3]\leq2.3$, where $M_2O_3=Al_2O_3+B_2O_3$, $R_xO$ is the sum of monovalent and divalent cation oxides present in the glass composition, and $R_2O$ is the sum of monovalent cation oxides present in the glass composition and the glass composition is capable of achieving a compressive stress from about 600 to about 1200 MPa at a depth of layer from about 10 to about 40 μm and an indentation fracture threshold from about 10 to about 50 kg.

2. The glass of claim 1, wherein the glass composition satisfies one or more of:

$0.6<[M_2O_3(mol\ \%)/R_xO(mol\ \%)]<1.4$;

$0.6<[M_2O_3(mol\ \%)/R_xO(mol\ \%)]<1$;

$1.3<[(P_2O_5+R_2O)/M_2O_3]\leq2.3$; and $1.5<[(P_2O_5+R_2O)/M_2O_3]\leq2.0$.

3. The glass of claim 1, wherein the glass comprises less than 1 mol % $K_2O$ or the monovalent and divalent cation oxides are selected from the group consisting of $Li_2O$, $Na_2O$, $K_2O$, $Rb_2O$, $Cs_2O$, MgO, CaO, SrO, BaO, and ZnO.

4. A glass article comprising the glass of claim 1.

5. A method of ion exchanging a glass article having a layer under compressive stress, the layer extending from a surface of the glass article to a depth of layer, comprising:
    a. providing the glass article of claim 4; and
    b. ion exchanging the glass article in a bath at a temperature of up to about 410° C. for from about 15 minutes to about 24 hours to form the layer,
wherein the compressive stress of the layer is from about 600 MPa to about 1200 MPa and the depth of layer is from about 10 μm to about 40 μm.

6. A method of making a device comprising a glass article having a layer under compressive stress, the layer extending from a surface of the glass article to a depth of layer, comprising:
    a. providing the glass article of claim 4;
    b. ion exchanging the glass article in a bath at a temperature of up to about 410° C. for from about 15 minutes to about 24 hours to form the layer,
wherein the compressive stress of the layer is from about 600 MPa to about 1200 MPa and the depth of layer is from about 10 μm to about 40 μm; and
incorporating the glass article into a device.

7. A glass for making a strengthened glass article, where the glass comprises an ion-exchangeable, alkali aluminosilicate glass composition comprising:

about 50 mol % to about 65 mol % $SiO_2$;

about 14 mol % to about 20 mol % $Al_2O_3$;

0 mol % to less than about 1 mol % $B_2O_3$;

about 4 mol % to about 10 mol % $P_2O_5$; and from 14 mol % to about 20 mol % $Na_2O$, wherein:

i. $0.6<[M_2O_3(mol\ \%)/R_xO(mol\ \%)]<1.4$; or ii. $1.3<[(P_2O_5+R_2O)/M_2O_3]\leq2.3$, where $M_2O_3=Al_2O_3+B_2O_3$, $R_xO$ is the sum of monovalent and divalent cation oxides present in the glass composition, and $R_2O$ is the sum of monovalent cation oxides present in the glass composition and the glass composition is capable of achieving a compressive stress from about 600 to about 1200 MPa at a depth of layer from about 10 to about 40 μm and an indentation fracture threshold from about 10 to about 50 kg.

8. The glass of claim 7, wherein the glass composition satisfies one or more of:

$0.6<[M_2O_3(mol\ \%)/R_xO(mol\ \%)]<1.4$;

$0.6<[M_2O_3(mol\ \%)/R_xO(mol\ \%)]<1$;

$1.3<[(P_2O_5+R_2O)/M_2O_3]\leq2.3$; and $1.5<[(P_2O_5+R_2O)/M_2O_3]\leq2.0$.

9. The glass of claim 7, wherein the glass comprises less than 1 mol % $K_2O$ or the monovalent and divalent cation oxides are selected from the group consisting of $Li_2O$, $Na_2O$, $K_2O$, $Rb_2O$, $Cs_2O$, MgO, CaO, SrO, BaO, and ZnO.

10. A glass article comprising the glass of claim 7.

* * * * *